United States Patent
DiCintio et al.

(10) Patent No.: US 9,316,155 B2
(45) Date of Patent: Apr. 19, 2016

(54) SYSTEM FOR PROVIDING FUEL TO A COMBUSTOR

(71) Applicant: General Electric Company, Schenectady, NY (US)

(72) Inventors: Richard Martin DiCintio, Simpsonville, SC (US); Patrick Benedict Melton, Horse Shoe, NC (US); Lucas John Stoia, Taylors, SC (US); Christopher Paul Willis, Liberty, SC (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 574 days.

(21) Appl. No.: 13/845,365

(22) Filed: Mar. 18, 2013

(65) Prior Publication Data

US 2014/0260272 A1  Sep. 18, 2014

(51) Int. Cl.
| | |
|---|---|
| *F02C 1/00* | (2006.01) |
| *F02C 7/22* | (2006.01) |
| *F01D 9/02* | (2006.01) |
| *F23R 3/34* | (2006.01) |

(52) U.S. Cl.
CPC .............. *F02C 7/222* (2013.01); *F01D 9/023* (2013.01); *F23R 3/34* (2013.01)

(58) Field of Classification Search
CPC ............ F23R 3/346; F23R 3/34; F23R 3/286; F23R 3/26; F01D 9/023
See application file for complete search history.

(56) References Cited

U.S. PATENT DOCUMENTS

| | | | |
|---|---|---|---|
| 3,872,664 A | 3/1975 | Lohmann | |
| 4,265,615 A | 5/1981 | Lohmann | |
| 4,420,929 A | 12/1983 | Jorgensen | |
| 5,069,029 A | 12/1991 | Kuroda | |
| 5,380,154 A | 1/1995 | Norton | |
| 5,450,725 A * | 9/1995 | Takahara | F23R 3/34 60/737 |

(Continued)

FOREIGN PATENT DOCUMENTS

| | | |
|---|---|---|
| EP | 0526058 A1 | 3/1993 |
| EP | 0578461 A1 | 12/1994 |
| EP | 1884297 A1 | 2/2008 |

OTHER PUBLICATIONS

Co-Pending U.S. Appl. No. 13/845,439, dated Mar., 18, 2013.

(Continued)

*Primary Examiner* — Gerald L Sung
(74) *Attorney, Agent, or Firm* — Dority & Manning, PA

(57) ABSTRACT

A system for providing fuel to a combustor of a gas turbine includes an annular fuel distribution manifold that at least partially defines a fuel plenum. The fuel distribution manifold includes a forward end axially separated from an aft end, a flange that extends radially outward and circumferentially around the forward end and an annular support ring that extends downstream from the flange. A LLI assembly extends downstream from the fuel distribution manifold. The LLI assembly includes a unibody liner that at least partially defines a primary combustion zone and a secondary combustion zone within the combustor. A LLI injector extends substantially radially through the unibody liner and provides for fluid communication through the unibody liner into the secondary combustion zone. A fluid conduit in fluid communication with the fuel plenum extends between the LLI injector and the fuel distribution manifold.

35 Claims, 21 Drawing Sheets

(56) References Cited

U.S. PATENT DOCUMENTS

| | | |
|---|---|---|
| 5,475,979 A | 12/1995 | Oag |
| 5,802,854 A | 9/1998 | Maeda |
| 6,047,550 A * | 4/2000 | Beebe ................. F23L 7/00 60/733 |
| 6,148,604 A | 11/2000 | Salt |
| 6,212,870 B1 | 4/2001 | Thompson et al. |
| 6,374,594 B1 | 4/2002 | Kraft et al. |
| 6,442,946 B1 | 9/2002 | Kraft |
| 6,450,762 B1 | 9/2002 | Munshi |
| 6,543,993 B2 | 4/2003 | Burdgick et al. |
| 6,654,710 B1 | 11/2003 | Keller |
| 6,875,009 B2 | 4/2005 | Kayahara et al. |
| 6,896,509 B2 | 5/2005 | Carroni et al. |
| 6,957,949 B2 | 10/2005 | Hyde et al. |
| 7,082,766 B1 | 8/2006 | Widener et al. |
| 7,743,612 B2 | 6/2010 | Morenko |
| 8,096,131 B2 | 1/2012 | Ziaei et al. |
| 8,158,428 B1 | 4/2012 | Krishna |
| 8,171,738 B2 | 5/2012 | Fish et al. |
| 2002/0184893 A1 * | 12/2002 | Farmer ................ F23R 3/06 60/804 |
| 2003/0039542 A1 | 2/2003 | Cromer |
| 2005/0044855 A1 | 3/2005 | Crawley |
| 2005/0241317 A1 * | 11/2005 | Martling ............. F01D 9/023 60/772 |
| 2005/0268617 A1 | 12/2005 | Amond |
| 2008/0282667 A1 | 11/2008 | Intile |
| 2009/0071157 A1 | 3/2009 | Cai |
| 2009/0199561 A1 | 8/2009 | Hessler |
| 2010/0054928 A1 | 3/2010 | Schiavo |
| 2010/0071377 A1 * | 3/2010 | Fox ..................... F23R 3/16 60/740 |
| 2010/0139283 A1 | 6/2010 | Phillips et al. |
| 2010/0170216 A1 | 7/2010 | Venkataraman |
| 2010/0174466 A1 | 7/2010 | Davis, Jr. et al. |
| 2010/0263386 A1 | 10/2010 | Edwards |
| 2011/0067402 A1 | 3/2011 | Wiebe |
| 2011/0146284 A1 | 6/2011 | Morimoto |
| 2011/0247314 A1 | 10/2011 | Chila |
| 2011/0304104 A1 | 12/2011 | McMahan |
| 2012/0186260 A1 | 7/2012 | DiCintio et al. |
| 2012/0210729 A1 | 8/2012 | Cihlar et al. |
| 2012/0304648 A1 * | 12/2012 | Byrne .................. F23R 3/06 60/737 |
| 2014/0033728 A1 | 2/2014 | Marmilic |
| 2014/0260272 A1 | 9/2014 | DiCintio |

OTHER PUBLICATIONS

Co-Pending U.S. Appl. No. 13/845,485, dated Mar. 18, 2013.
Co-Pending U.S. Appl. No. 13/845,565, dated Mar. 18, 2013.
Co-Pending U.S. Appl. No. 13/845,617, dated Mar. 18, 2013.
Co-Pending U.S. Appl. No. 13/845,661, dated Mar. 18, 2013.
Co-Pending U.S. Appl. No. 13/845,699, dated Mar. 18, 2013.
Co-Pending U.S. Appl. No. 13/845,384, dated Mar. 18, 2013.
Co-Pending U.S. Appl. No. 13/845,378, dated Mar. 18, 2013.

* cited by examiner

SYSTEM FOR PROVIDING FUEL TO A COMBUSTOR

FIELD OF THE INVENTION

The present invention generally involves a combustor of a gas turbine. More specifically, the invention relates to a system for providing fuel to a secondary combustion zone defined within the combustor.

BACKGROUND OF THE INVENTION

A typical gas turbine that is used to generate electrical power includes an axial compressor at the front, one or more combustors downstream from the compressor, and a turbine at the rear. Ambient air may be supplied to the compressor, and rotating blades and stationary vanes in the compressor progressively impart kinetic energy to the working fluid (air) to produce a compressed working fluid at a highly energized state. The compressed working fluid exits the compressor and flows towards a head end of combustor where it reverses direction at an end cover and flows through the one or more nozzles into a primary combustion zone that is defined within a combustion chamber in each combustor. The compressed working fluid mixes with fuel in the one or more fuel nozzles and/or within the combustion chamber and ignites to generate combustion gases having a high temperature and pressure. The combustion gases expand in the turbine to produce work. For example, expansion of the combustion gases in the turbine may rotate a shaft connected to a generator to produce electricity.

A typical combustor includes an end cover coupled to a compressor discharge casing, an annular cap assembly that extends radially and axially within the compressor discharge casing, an annular combustion liner that extends downstream from the cap assembly, and a transition piece having an annular transition duct that extends between the combustion liner and a first stage of stationary nozzles. The stationary nozzles are positioned generally adjacent to an inlet to the turbine section.

In a particular combustor design, one or more LLI injectors, also known as late lean injectors, are circumferentially arranged around and mounted to the combustion liner downstream from the fuel nozzles and/or the primary combustion zone. Various fluid conduits and fluid couplings extend within the compressor discharge casing to route fuel from a fuel source to the LLI injectors. A portion of the compressed working fluid exiting the compressor is routed through the LLI injectors to mix with the fuel to produce a lean fuel-air mixture. The lean fuel-air mixture may then be injected into the combustion chamber for additional combustion in a secondary combustion zone to raise the combustion gas temperature and increase the thermodynamic efficiency of the combustor. The late lean injectors are effective at increasing combustion gas temperatures without producing a corresponding increase in the production of undesirable emissions such as oxides of nitrogen ($NO_X$). The late lean injectors are particularly beneficial for reducing $NO_X$ during base load and/or turndown operation of the gas turbine.

Installation and removal of a combustor having late lean injection hardware to and/or from a space limited environment such as the compressor discharge casing of the gas turbine has become increasingly challenging due in part to a decreasing footprint of many current gas turbine designs. For example, access to the various fluid couplings, fluid conduits and/or the LLI injectors may be restricted. In addition, valuable man hours required to assemble or disassemble the various late lean injection components to the combustor while mounted to the gas turbine may be excessive due to the difficulty related to proper installation and removal of the late lean injection hardware. Therefore, a system for providing fuel to the combustor that reduces assembly time and complexity of the combustor would be useful.

BRIEF DESCRIPTION OF THE INVENTION

Aspects and advantages of the invention are set forth below in the following description, or may be obvious from the description, or may be learned through practice of the invention.

One embodiment of the present invention is a system for providing fuel to a combustor of a gas turbine. The system includes an annular fuel distribution manifold that at least partially defines a fuel plenum. The fuel distribution manifold includes a forward end axially separated from an aft end, a flange that extends radially outward and circumferentially around the forward end and an annular support ring that extends downstream from the flange. A LLI injection assembly extends downstream from the fuel distribution manifold. The LLI injection assembly includes a unibody liner that at least partially defines a primary combustion zone and a secondary combustion zone within the combustor. A LLI injector extends substantially radially through the unibody liner and provides for fluid communication through the unibody liner into the secondary combustion zone. A fluid conduit in fluid communication with the fuel plenum extends between the LLI injector and the fuel distribution manifold.

Those of ordinary skill in the art will better appreciate the features and aspects of such embodiments, and others, upon review of the specification.

BRIEF DESCRIPTION OF THE DRAWINGS

A full and enabling disclosure of the present invention, including the best mode thereof to one skilled in the art, is set forth more particularly in the remainder of the specification, including reference to the accompanying figures, in which.

DETAILED DESCRIPTION OF THE INVENTION

Figure 1:
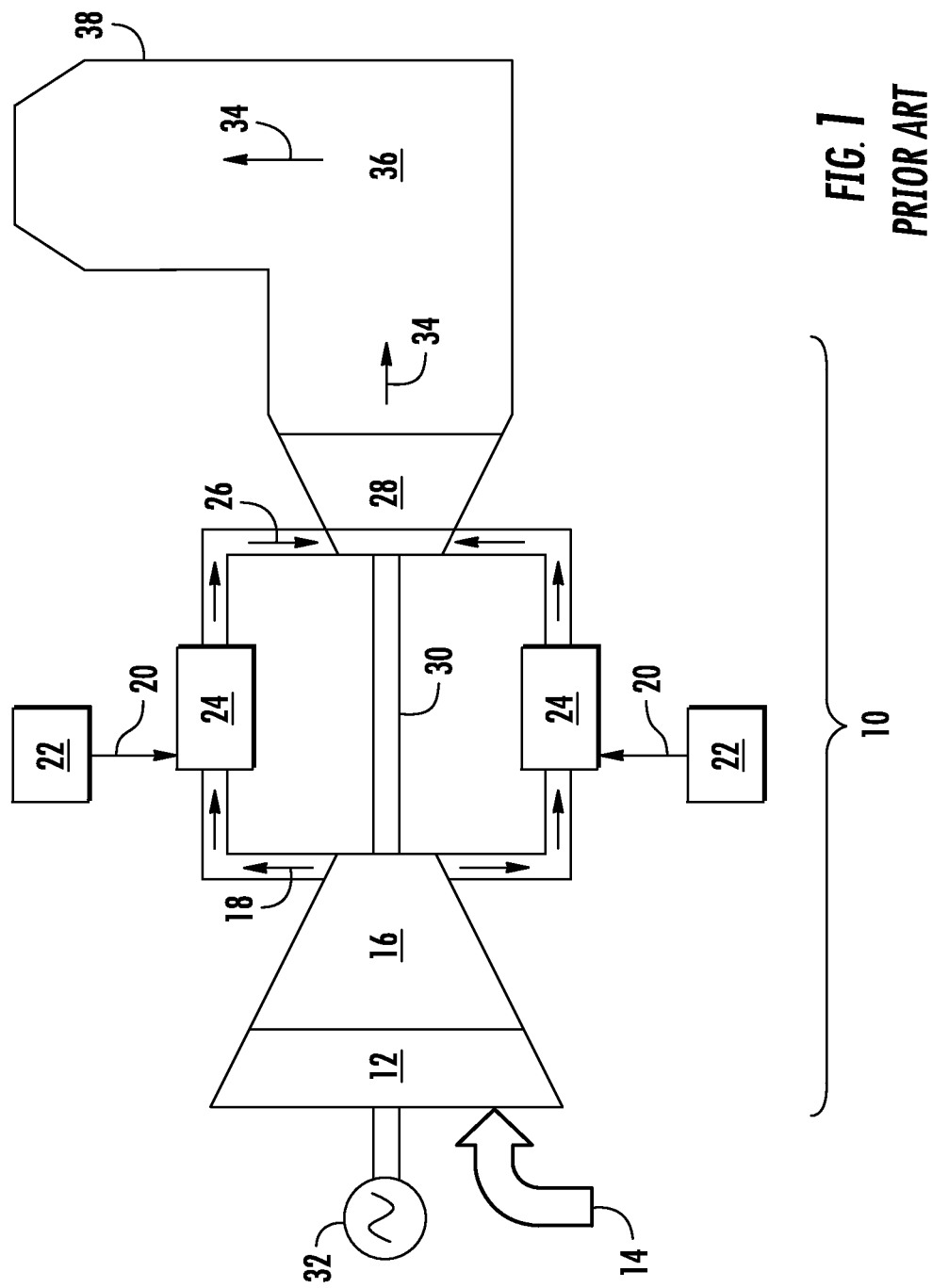
FIG. 1 is a functional block diagram of an exemplary gas turbine within the scope of the present invention.

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention. As used herein, the terms "first", "second", and "third" may be used interchangeably to distinguish one component from another and are not intended to signify location or importance of the individual components. The terms "upstream" and "downstream" refer to the relative direction with respect to fluid flow in a fluid pathway. For example, "upstream" refers to the direction from which the fluid flows, and "downstream" refers to the direction to which the fluid flows. The term "radially" refers to the relative direction that is substantially perpendicular to an axial centerline of a particular component, and the term "axially" refers to the relative direction that is substantially parallel to an axial centerline of a particular component.

Each example is provided by way of explanation of the invention, not limitation of the invention. In fact, it will be apparent to those skilled in the art that modifications and variations can be made in the present invention without departing from the scope or spirit thereof. For instance, features illustrated or described as part of one embodiment may be used on another embodiment to yield a still further embodiment. Thus, it is intended that the present invention covers such modifications and variations as come within the scope of the appended claims and their equivalents. Although exemplary embodiments of the present invention will be described generally in the context of a combustor incorporated into a gas turbine for purposes of illustration, one of ordinary skill in the art will readily appreciate that embodiments of the present invention may be applied to any combustor incorporated into any turbomachine and is not limited to a gas turbine combustor unless specifically recited in the claims.

Referring now to the drawings, wherein identical numerals indicate the same elements throughout the figures, FIG. 1 provides a functional block diagram of an exemplary gas turbine 10 that may incorporate various embodiments of the present invention. As shown, the gas turbine 10 generally includes an inlet section 12 that may include a series of filters, cooling coils, moisture separators, and/or other devices to purify and otherwise condition a working fluid (e.g., air) 14 entering the gas turbine 10. The working fluid 14 flows to a compressor section where a compressor 16 progressively imparts kinetic energy to the working fluid 14 to produce a compressed working fluid 18 at a highly energized state.

The compressed working fluid 18 is mixed with a fuel 20 from a fuel supply 22 to form a combustible mixture within one or more combustors 24. The combustible mixture is burned to produce combustion gases 26 having a high temperature and pressure. The combustion gases 26 flow through a turbine 28 of a turbine section to produce work. For example, the turbine 28 may be connected to a shaft 30 so that rotation of the turbine 28 drives the compressor 16 to produce the compressed working fluid 18. Alternately or in addition, the shaft 30 may connect the turbine 28 to a generator 32 for producing electricity. Exhaust gases 34 from the turbine 28 flow through an exhaust section 36 that connects the turbine 28 to an exhaust stack 38 downstream from the turbine 28. The exhaust section 36 may include, for example, a heat recovery steam generator (not shown) for cleaning and extracting additional heat from the exhaust gases 34 prior to release to the environment.

Figure 2:
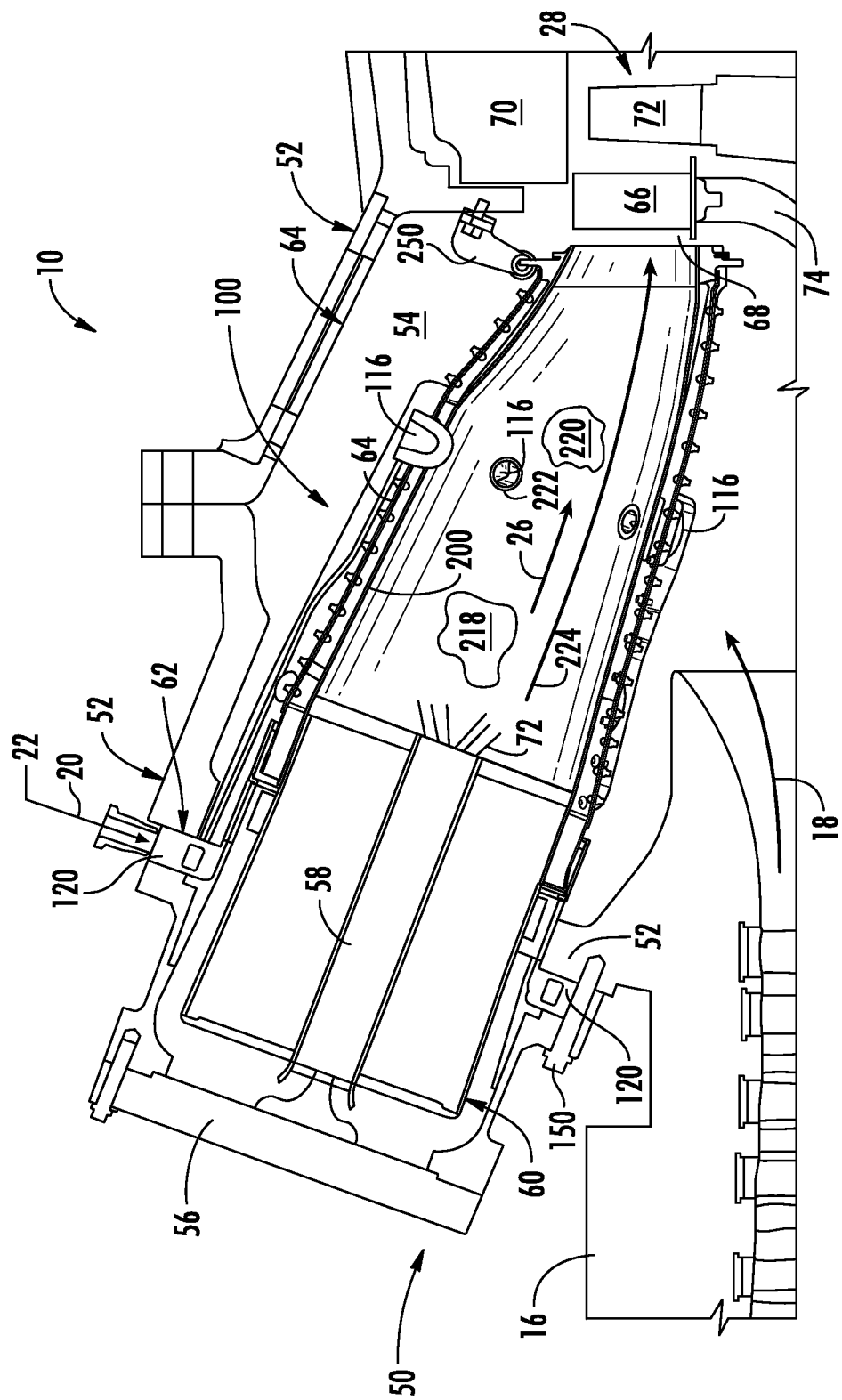
FIG. 2 is a cross sectional side view of a portion of an exemplary gas turbine, including an exemplary combustor that may encompass various embodiments of the present invention.

FIG. 2 provides a cross sectional side view of a portion of an exemplary gas turbine 10 including an exemplary combustor 50 that may encompass various embodiments of the present disclosure. As shown, the combustor 50 is at least partially surrounded by at least one outer casing 52 such as a compressor discharge casing and/or an outer turbine casing. The outer casing 52 is in fluid communication with the compressor 16 and at least partially defines a high pressure plenum 54 that surrounds at least a portion of the combustor 50. An end cover 56 is coupled to the outer casing 52 at one end of the combustor 50. The combustor 50 generally includes at least one axially extending fuel nozzle 58 that extends downstream from the end cover 56 and an annular cap assembly 60 that extends radially and axially within the outer casing 52 downstream from the end cover 56.

The outer casing generally includes at least one opening 62 for installing the combustor 50. In one embodiment, an access or arm-way 64 extends through the outer casing 52 to provide for access to at least a portion of the combustor 50 from outside of the outer casing 52. In one embodiment, the gas turbine 10 includes a stage of stationary turbine nozzles 66 that at least partially define an inlet 68 to the turbine 28. The turbine 28 includes an inner casing 70 that circumferentially surrounds various stages of turbine rotor blades 72 that are coupled to the shaft 30 (FIG. 1) within the turbine 28. In particular embodiments, the stationary turbine nozzles 66 are connected to the inner casing 70. In further embodiments, the stationary nozzles 66 are also coupled to an inner support ring 74.

Figure 3:
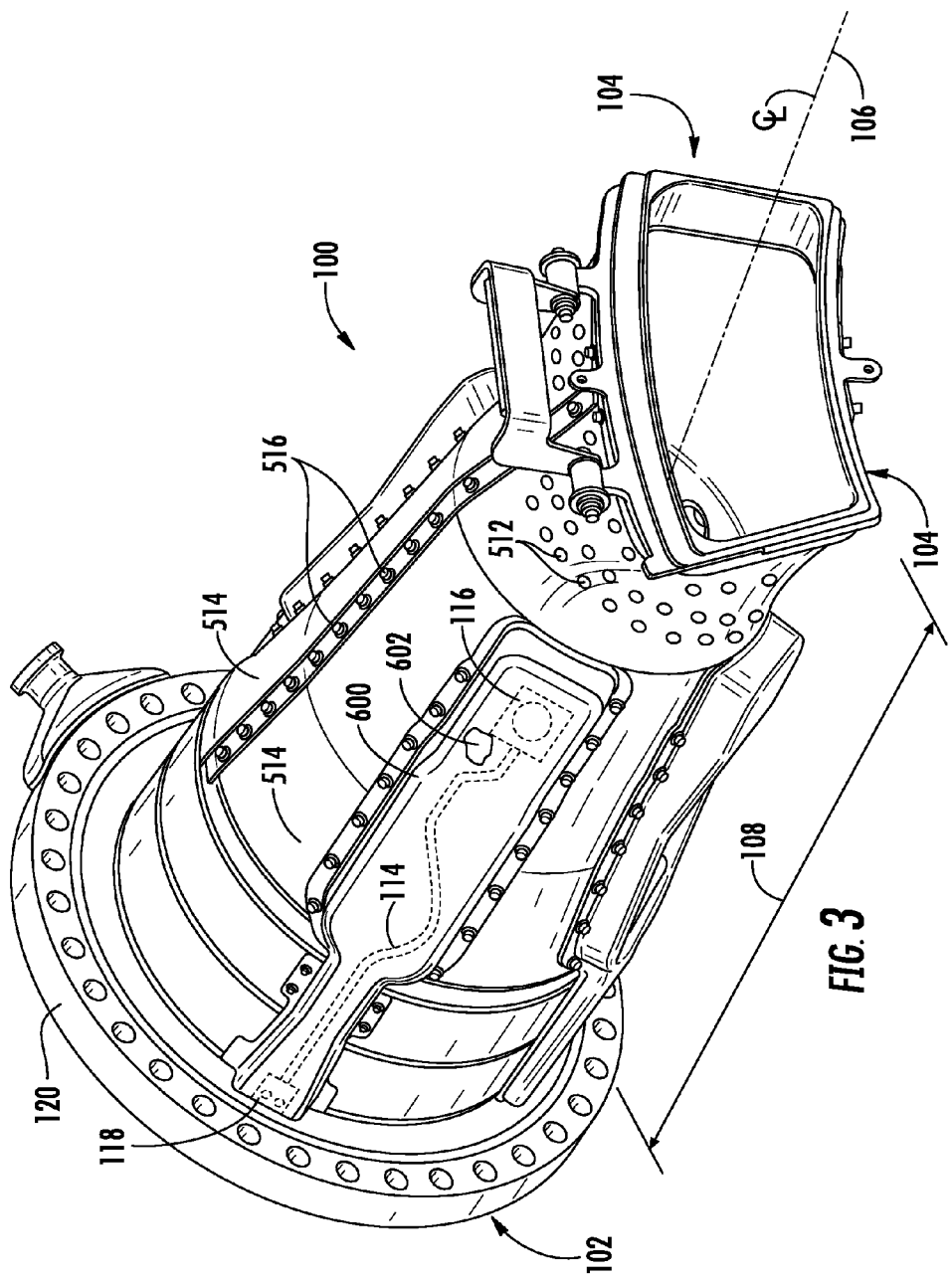
FIG. 3 is a perspective view of a system for providing fuel to a combustor of a gas turbine as shown in FIG. 2, according to at least one embodiment of the present invention.
Figure 4:
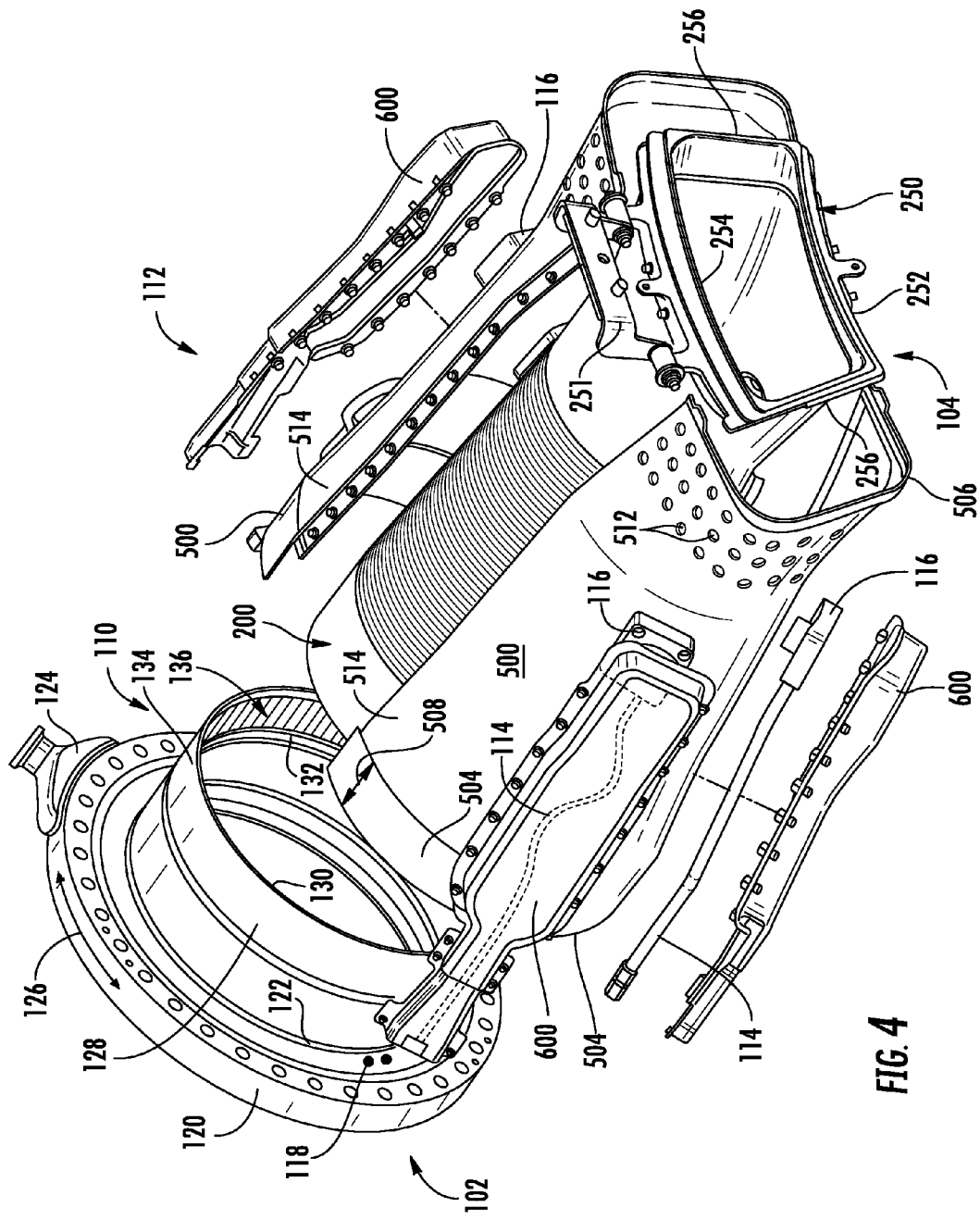
FIG. 4 is an exploded perspective view of the system as shown in FIG. 3, according to at least one embodiment of the present invention.

In various embodiments, as shown in FIG. 2, the combustor 50 includes a system for providing fuel to a secondary combustion zone within the combustor 50, herein referred to as "system 100". FIG. 3 provides an assembled view of the system 100 according to particular embodiments, and FIG. 4 provides an exploded view of the system 100 as shown in FIG. 3. As shown in FIG. 3, the system generally includes an upstream or forward end 102 and a downstream or aft end 104. The forward end 102 is axially separated from the aft end 104 with respect to an axial centerline 106 of the system 100. As shown in FIG. 3, the system 100 may be provided as a pre-assembled or at least partially pre-assembled combustion module 108, thereby providing various benefits over exiting combustor configurations. For example, man hours related to on site assembly and disassembly may be significantly reduced. In addition or in the alternative, leak checks of critical fuel connections may be completed prior to installation of the system 100, thereby improving overall safety and/or reliability of the combustor 50.

In particular embodiments, as shown in FIG. 4, the combustion module 100 includes an annular fuel distribution manifold 110 that extends downstream from the forward end 102 towards the aft end 206, a LLI injection assembly 112 that extends downstream from the fuel distribution manifold 110 and terminates at the aft end 206, and at least one fluid conduit 114 that fluidly couples and/or connects the fuel distribution manifold 110 to the LLI injection assembly 112. As shown in FIG. 2, the fuel distribution manifold 110 may at least partially surround a portion of the cap assembly 60 when installed into the combustor 50.

In various embodiments, as shown in FIG. 3, the fluid conduit 114 provides for fluid communication between the fuel distribution manifold 110 and a LLI injector 116 such as a late-lean injector of the LLI injection assembly 112. In one embodiment, the fluid conduit 114 is generally serpentine shaped. The serpentine shaped fluid conduit 114 allows for relative movement between the fuel distribution manifold 110 and the LLI injection assembly 112 as the outer casing 52 and or the combustor 50 transition through various thermal transient conditions such as during startup, shutdown and/or turndown operation of the gas turbine 10. In addition, the serpentine shaped fluid conduit 114 may reduce load stress at a fuel connection port 118 (FIGS. 3 and 4) and/or at the LLI injector 116, thereby improving the reliability of the system 100 and/or the overall performance of the combustor 50.

In particular embodiments, as shown in FIG. 4, a flange 120 extends radially outward from and circumferentially around an upstream end 122 of the fuel distribution manifold 110. A fuel distribution cap 124 extends outward from an outer surface 126 of the flange 120. The outer surface 126 extends circumferentially around the flange 120. An annular support sleeve or ring 128 extends downstream from the upstream end 122 of the flange 120 towards a downstream end 130 of the fuel distribution manifold 110. The support ring 128 generally includes an inner surface 132 radially separated from an outer surface 134. A compression spring seal 136 such as a hula seal may be disposed along the inner surface 132.

In particular embodiments, as shown in FIG. 4, the fuel distribution cap 124 extends partially across the outer surface 126 of the flange 120. For example, the fuel distribution cap 124 generally extends axially and circumferentially across at least a portion of the outer surface 126 of the flange 120 and radially outward from the outer surface 126 of the flange 120. The fuel distribution cap 124 may be connected to the flange 120 by welding, brazing or by any other mechanical means known in the art suitable for the operating environment of the fuel distribution manifold 110.

Figure 5:
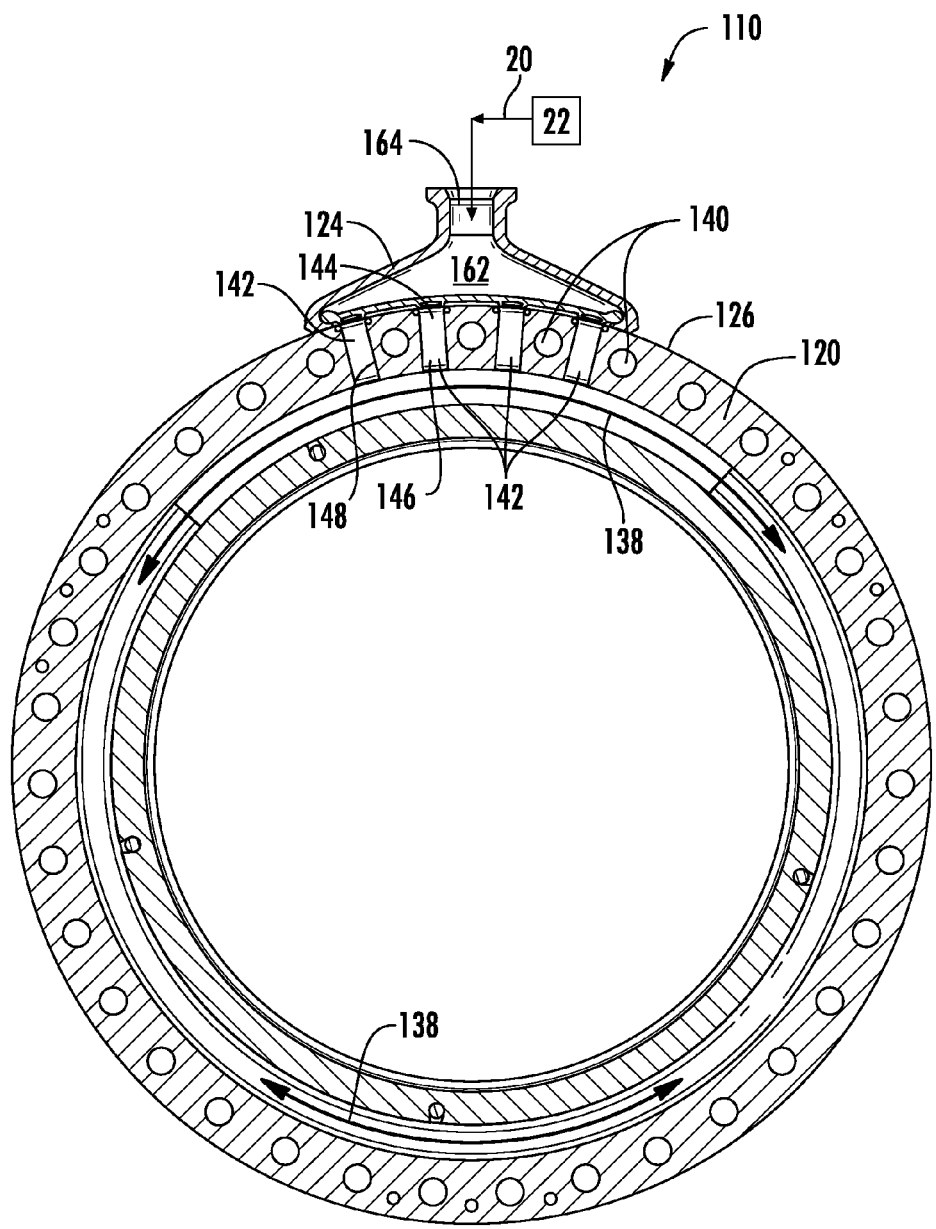
FIG. 5 is a cross sectional downstream view of the system as shown in FIG. 4, according to at least one embodiment of the present invention.
Figure 6:
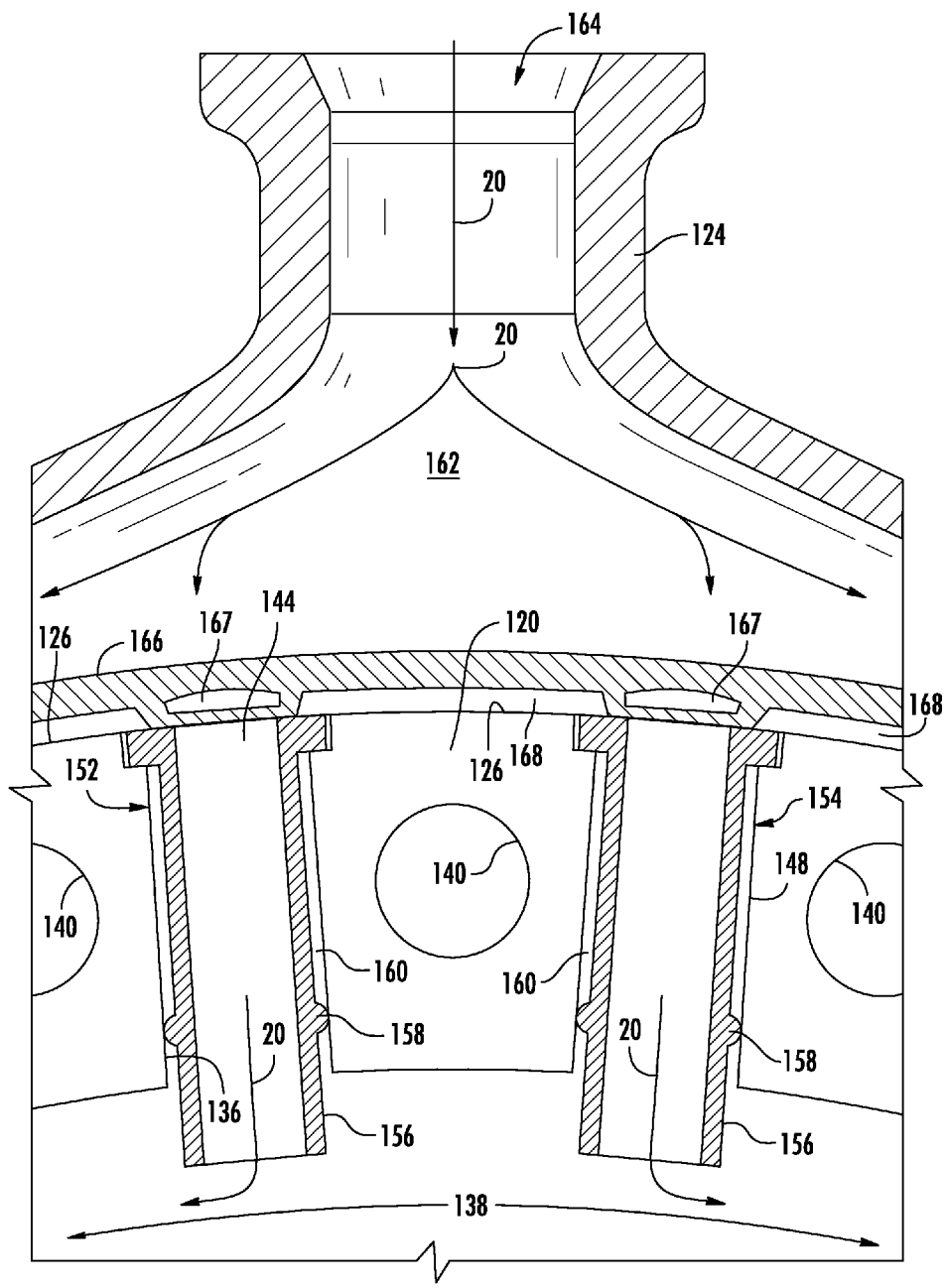
FIG. 6 is a cross sectioned enlarged view of a portion of the system including a pair of orifice inserts according to at least one embodiment of the present invention.

FIG. 5 provides a cross sectional downstream view of the fuel distribution manifold 110 including the fuel distribution cap 124 according to one embodiment of the present invention, and FIG. 6 provides an enlarged view of a portion of the fuel distribution manifold 110 including a portion of the fuel distribution cap 124 as shown in FIG. 5, according to at least one embodiment of the present disclosure. As shown in FIG. 5, a primary fuel plenum 138 extends circumferentially within the flange 120. The primary fuel plenum 138 may be cast into the flange 120 and/or may be machined into the flange 120. A plurality of bolt holes 140 extend axially through the flange 120. The bolt holes 140 are generally evenly spaced circumferentially around the flange 120 to provide for an even pre-load around the circumference of the flange 120 when installed into the combustor 50 as shown in FIG. 2.

As shown in FIGS. 5 and 6, at least two orifices 142 extend through the outer surface 126 of the flange 120 to provide for fluid communication into the primary fuel plenum 138. As shown in FIG. 5, each orifice 142 includes an inlet 144 generally adjacent to the outer surface 126 of the flange 120 and an outlet 146 that is generally adjacent and in fluid communication with the primary fuel plenum 138. Each orifice 142 includes an inner surface 148 that extends between the inlet 132 and the outlet 134. By having at least two of the orifices 142, additional fuel inlet area may be provided when compared to a single orifice without offsetting the circumferential spacing between the bolt holes 140. As a result fuel velocity may be lowered as fuel enters the primary fuel plenum 138, thereby resulting in a more even fuel distribution within the primary fuel plenum 138. In addition, by having at least two orifices 142 rather than one large orifice, wall thickness between each orifice 142 and a corresponding bolt hole 140 is optimized, thereby enhancing the durability of the flange 120 and allowing for a thinner flange 120 which decreases weight and cost. In addition, by having at least two orifices 142, an even pre-load at each bolt hole 140 location around the flange 120, thereby providing for an even/robust seal between the outer casing 52 (FIG. 2) and the flange 120 while maintaining a sufficient mass flow of the fuel 20 into the primary fuel plenum 138.

In one embodiment, as shown in FIG. 6, the at least two orifices 142 comprises a first orifice 152 and a second orifice 154 extend radially through the outer surface 126 of the flange 120 to provide for fluid communication into the primary fuel plenum 138. Both the first orifice 152 and the second orifice 154 orifice extend between two adjacent bolt holes 140 without interrupting a common circumferential spacing between each of the plurality of bolt holes 140. In one embodiment, each of the first and the second orifices 152, 154 includes an orifice insert 156. Each orifice insert 156 is coaxially or concentrically aligned within each corresponding orifice 152, 154. The orifice inserts 156 may be sized and/or shaped the same or differently so as to achieve a desired flow rate of fuel flowing into the primary fuel plenum 138.

In one embodiment, as shown in FIG. 6, each orifice insert 156 includes a rib 158 or other separation feature. The rib 158 generally positions the orifice insert 156 concentrically and/ or coaxially into the corresponding orifice 152, 154. The rib 158 also provides for an insulation gap 160 between the orifice insert 156 and the corresponding orifice 152, 154, thereby reducing conductive cooling of the flange 120 caused by the fuel flowing through the corresponding orifice inserts 152, 154 into the primary fuel plenum 138. As a result, thermal stress associated with the thermal gradients between the fuel and the flange 120 may be reduced which enhances the overall durability of the fuel distribution manifold 110.

In particular embodiments, as shown in FIGS. 5 and 6, the fuel distribution cap 124 extends or flares out across a portion of the outer surface 126 of the flange 120 to form a fuel distribution plenum 162. The fuel distribution cap 124 generally extends across the inlet 144 of each of the orifices 142 and provides for fluid communication between the fuel distribution plenum 162 and the inlet 144 of each of the orifices 142. By flaring the fuel distribution cap 124, pressure head of the fuel 20 is at least partially stabilized before it is fed into each orifice 142. As a result, the flow velocity of the fuel 20 may be regulated so as to evenly distribute the fuel 20 between each orifice 142 as the fuel flows into the primary fuel plenum 138, thereby enhancing the overall performance of the fuel distribution manifold 110. In particular embodiments, the fuel distribution cap 124 includes an inlet port 164 that provides for fluid communication between the fuel source 22 (FIG. 2) and the fuel distribution plenum 162 (FIGS. 5 and 6).

In one embodiment, as shown in FIG. 6, the fuel distribution cap 124 comprises a floor portion 166 that partially defines the fuel distribution plenum 162. The floor portion defines at least one outlet 167 coaxially aligned with a corresponding orifice 142 and/or orifice insert 156. An insulation gap 168 is defined between the floor portion 166 of the fuel distribution cap 124 and the outer surface 126 of the flange. In operation, the flange 120 is generally much hotter than the fuel 20 flowing into the fuel distribution cap 124 and into the orifices 142. The insulation gap 168 provides an insulation boundary between the fuel 20 and the outer surface 126 of the flange 120, thereby reducing thermal stresses around the fuel distribution cap 124 and along the flange 120 outer surface 126. As a result, the overall durability of the fuel distribution manifold 110 may be enhanced.

Figure 7:
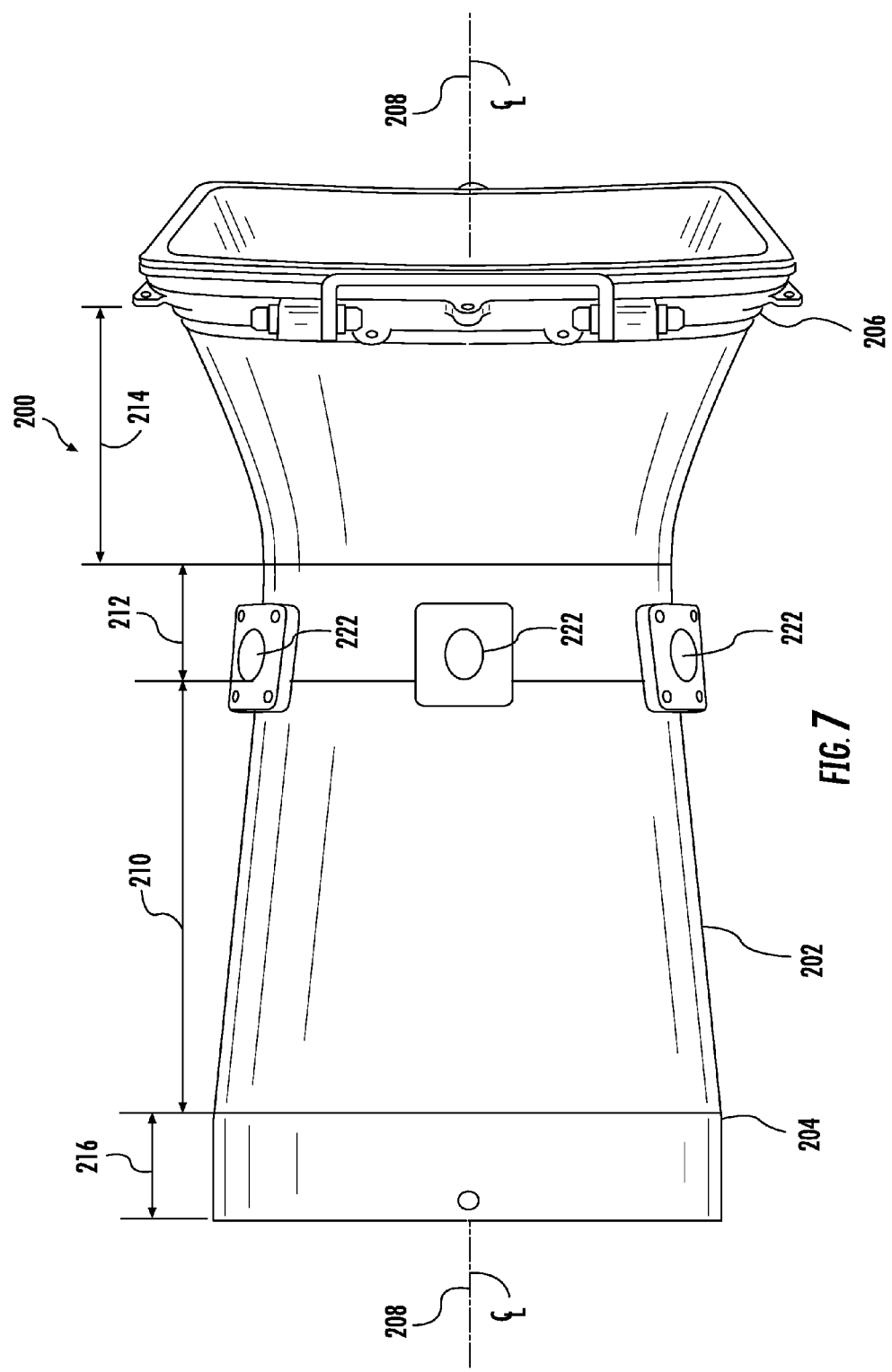
FIG. 7 is a top view of a unibody liner portion of the system as shown in FIG. 4.
Figure 8:
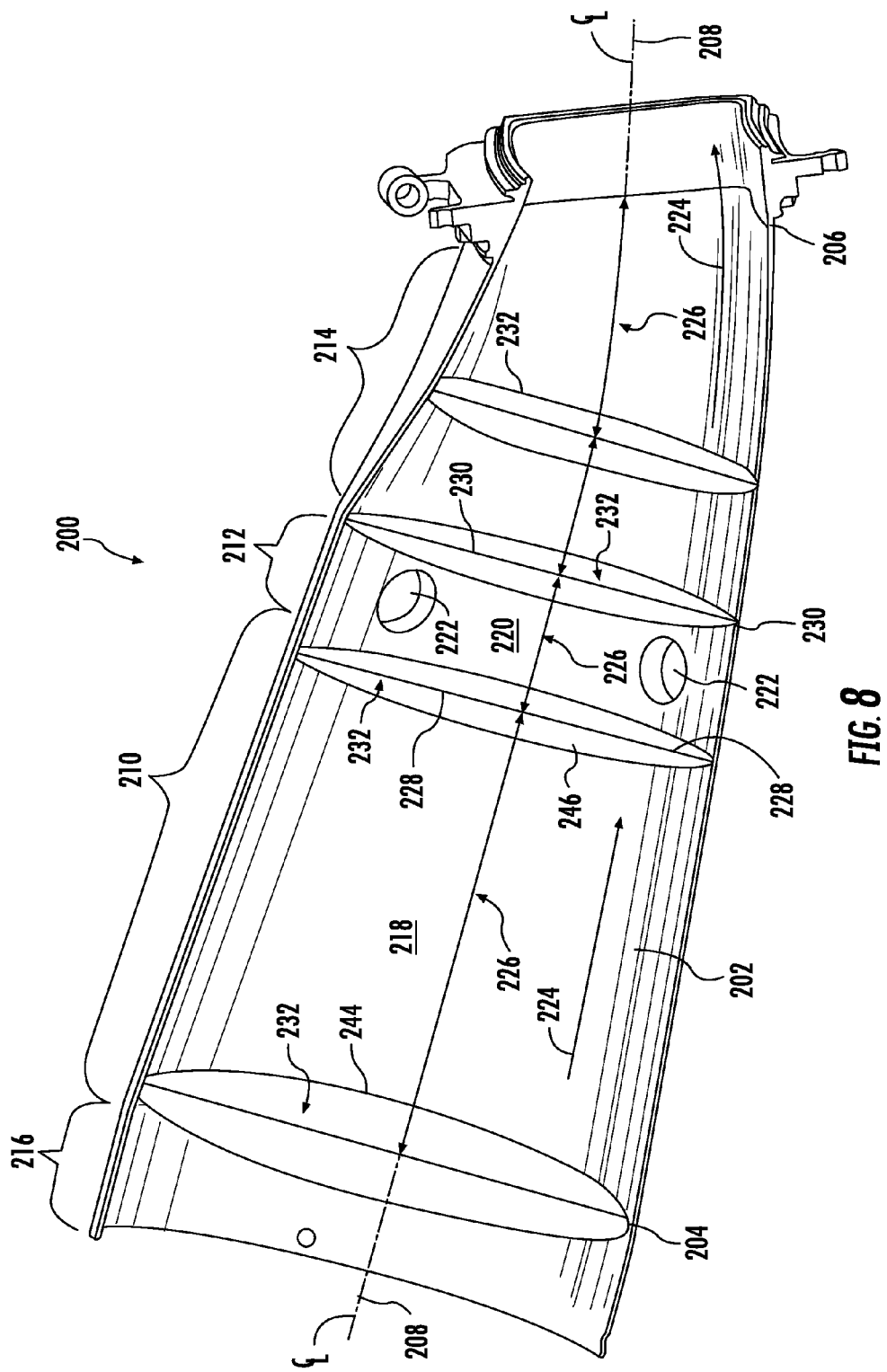
FIG. 8 is a cross-section perspective view of the unibody liner as shown in FIG. 7, according to at least one embodiment of the present disclosure.

Referring back to FIG. 4, the LLI injection assembly 112 generally includes a unibody liner 200 that extends between the fuel distribution manifold and the aft end 206 of the system 100. FIG. 7 provides a top view of the unibody liner as shown in FIG. 4 according to various embodiments. FIG. 8 provides a cross section side view of the unibody liner as shown in FIG. 7. As shown in FIGS. 7 and 8, the unibody liner 200 generally includes a main body 202 having a generally annular shape.

As shown in FIGS. 7 and 8, the main body 202 has a forward end 204 axially separated from an aft end 206 with respect to an axial centerline 208 of the unibody liner 200. The main body 202 extends continuously from the forward end 204 to the aft end 206, thereby eliminating the need for a separate combustion liner and transition duct as traditionally required in conventional combustion designs. In particular embodiments, the main body 202 comprises a conical portion 210, a LLI injection portion 212 that extends downstream from the conical portion 210 and a transition portion 214 that extends downstream from the LLI injection portion 212. In particular embodiments, the unibody liner 200 further includes a support portion 216 that extends upstream from the forward end 204. The unibody liner 200 may be cast as a singular component or may be formed from individual components which are connected so as to form a continuous hot gas path through the combustor.

As shown in FIGS. 2 and 8, the unibody liner 200 generally defines a primary combustion zone 218 downstream from the forward end 204 and defined generally within the conical portion 210, and a secondary combustion zone 220 that is disposed downstream from the primary combustion zone 218 and upstream from the aft end 206. The secondary combustion zone 220 is defined at least partially within the LLI injection portion 212.

The conical portion 210 extends between the forward end 204 and the LLI injection portion 212, and the transition portion 214 extends downstream from the LLI injection portion 212 and terminates generally adjacent to the aft end 206. The LLI injection portion 212 generally extends across at least a portion of the secondary combustion zone 220. The conical portion 210 generally has a substantially circular cross section with respect to a plane that is perpendicular to the axial centerline 208. The LLI injection portion 212 may have a substantially circular cross section and/or a substantially non-circular cross section with respect to a plane that is perpendicular to the axial centerline 208. As shown in FIG. 7, the transition portion 214 has a substantially non-circular cross section with respect to a plane that is perpendicular to the axial centerline 208.

In particular embodiments, as shown in FIGS. 7 and 8, one or more LLI injector openings 222 extend through the main body 202 downstream from the forward end 204 and upstream from the aft end 206. The LLI injector openings 222 are disposed within the LLI injection portion 212 of the main body 202. The LLI injector openings 222 provide for fluid communication through the main body 202 and into a hot gas path 224 that is at least partially defined within the main body 202. In particular embodiments, as shown in FIG. 2, each of the LLI injector 116 extends at least partially through a corresponding one LLI injector opening 222.

In at least one embodiment, as shown in FIG. 8, an axial flow length 226 is defined along the axial centerline 208. The axial flow length 226 extends through the main body 202 between the forward end 204 and the aft end 206. In particular embodiments, the LLI injection openings 222 generally define an intersection point 228 along the axial flow length 226 where the conical portion 210 and the LLI injection portion 212 intersect. The intersection point 228 may be defined adjacent to or upstream from the LLI injection openings 222. Another intersection point 230 is generally defined along the axial flow length 226 where the LLI injection portion 212 and the transition portion 214 intersect. This intersection point 230 is generally defined at a position along the axial flow length 226 where the main body 202 transitions from a substantially circular cross section to a substantially non-circular cross section downstream from the LLI injector openings 222.

The intersection points 228 and 230 are generally defined within a plane that is substantially perpendicular to the axial centerline 208. The intersection points 228 and 230 may shift upstream or downstream from the shown positions shown in FIG. 8 depending on such factors as the diameter of the unibody liner 200, a desired or required mass flow rate through the unibody liner 200, operating temperatures within the unibody liner 200, thermal profile of the unibody liner 200 and/or positioning of the LLI openings 222.

As shown in FIG. 8, the main body 202 defines a cross-sectional flow area 232. The cross sectional flow area 232 is generally defined with respect to a plane that extends perpendicular to the axial centerline 208. The cross-sectional flow area 232 may increase, decrease, or remain constant along any portion of the axial flow length 226. The size of the cross-sectional flow area 232 of the body 100 main body 202 generally affects a flow velocity of the combustion gases 26 (FIG. 2) flowing through the main body 202.

Figure 9:
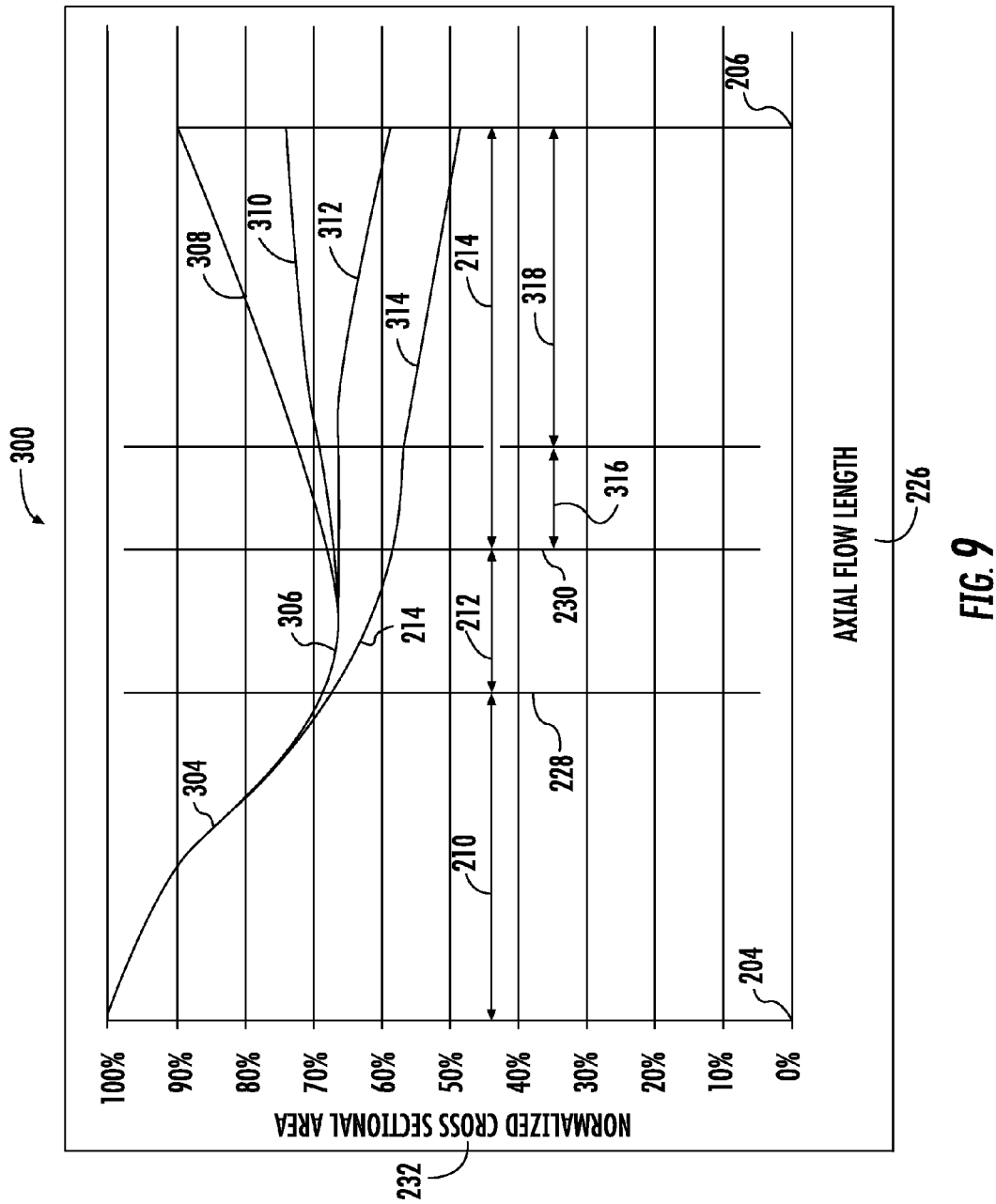
FIG. 9 is a normalized graphical illustration of cross-sectional flow area of the unibody liner as shown in FIG. 8, with respect to axial flow length across a conical portion, a LLI injection portion and a transition portion of the unibody liner according to various embodiments of the present invention.

FIG. 9 provides a normalized graphical illustration 300 of cross-sectional flow area 232 with respect to axial flow length 226 across the conical portion 210, the LLI injection portion 212 and the transition portion 214 of the main body 202 of the unibody liner 200. As illustrated by line 304, the cross-sectional flow area 232 generally decreases along the axial flow length 226 from a maximum cross-sectional flow area 232 at the forward end 204 to a smaller cross-sectional flow area 232 at the intersection point 228 defined between the conical portion 210 and the LLI injection portion 212 of the main body 202. It should be appreciated that line 304 also illustrates a cross-sectional area of a typical traditional liner (not shown).

In particular embodiments, as illustrated by line 306, the cross-sectional flow area 232 may increase, remain constant and/or may decrease along the axial flow length 226 across the LLI injection portion 212. In particular embodiments, as illustrated by lines 308, 310 and 312, the cross-sectional flow area 232 increases along at least a portion of the axial flow length 226 that is defined downstream from the intersection point 230. In contrast, as illustrated by line 314, the cross-sectional flow area 232 of the traditional liner continues to decrease through the LLI injection portion 212 and the transition portion 214.

In one embodiment, as illustrated by line 308, the cross-sectional flow area 232 increases continuously downstream from the intersection point 230 between the LLI injection portion 212 and the aft end 206 at a substantially continuous rate. In another embodiment, the cross-sectional flow area 232 increases continuously along a first portion 316 of the axial flow length 226 that is defined downstream from the intersection point 230 at a first rate of increase, and then increases at a second rate of increase along a second portion 318 of the axial flow length 226 that is defined downstream from the first portion 316. In another embodiment, the cross-sectional flow area 232 increases continuously along the first portion 316 of the axial flow length 226 that is defined downstream from the intersection point 230 and then decreases along the second portion 318 of the axial flow length 226 that is defined downstream from the first portion 316.

Figure 10:
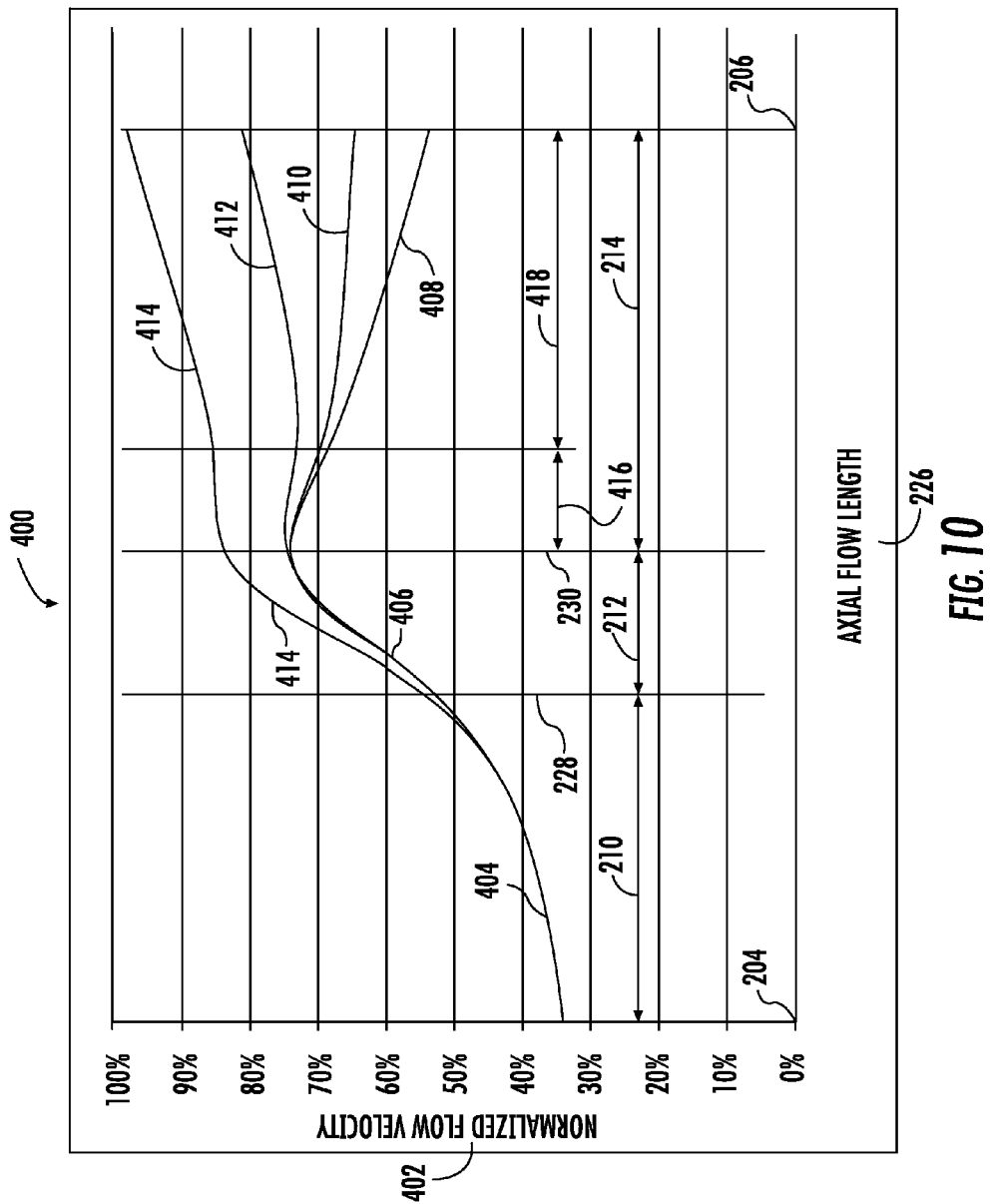
FIG. 10 is a normalized graphical illustration of flow velocity through the unibody liner with respect to axial flow length as related to the cross-sectional flow area as shown in FIG. 8, according to various embodiments of the present invention.

FIG. 10 provides a normalized graphical illustration 400 of flow velocity 402 of the combustion gases 26 (FIG. 2) through the main body 202 of the unibody liner 200 including the traditional transition liner or duct with respect to axial flow length 226 through the conical portion 210, the LLI injection portion 212 and the transition portion 214 of the main body 202 and traditional liner or duct. As shown between FIGS. 9 and 10, line 404 correlates to line 304, line 406 correlates to line 306, line 408 correlates to line 308, line 410 correlates to line 310, line 412 correlates to line 312, line 414 correlates to line 314, 416 correlates to 316 and 418 correlates to 318.

As shown in FIGS. 9 and 10, and illustrated in lines 304 and 404, the flow velocity of the combustion gases 26 (FIG. 2) increase as the cross-sectional flow area 232 decreases along the axial flow length 226 through the conical portion 210. As illustrated by lines 306, 314 and 406 and 414, the flow velocity will increase at a much higher rate along the axial flow length 226 within the LLI injection portion 212 due to additional mass flow of the second combustible mixture and/or the compressed air through the main body 202 (FIG. 8) and into the hot gas path 224 (FIG. 8).

The increased flow velocity generally results in increased heat transfer coefficients at the transition portion 214 which results in hot spots or areas of high thermal stress on an inner surface (not shown) of the main body 202 of the unibody liner 200 and/or the traditional liner or duct. In the various embodiments of the present invention, as shown in FIG. 9 by lines 308, 310, 312, an increase in the cross-sectional flow area 232 at or downstream from the LLI injection portion 212 will result in a decrease in the flow velocity 402 of the combustion gases 26 (FIG. 2) as shown in FIG. 10 by lines 410, 412 and 414. By maintaining or reducing the flow velocity 402 through the main body 202 of the unibody liner 200 at or downstream from the LLI injection portion 212, heat transfer coefficients of the main body 202 are significantly reduced, thereby improving the durability and overall performance of the combustor.

Referring back to FIG. 4, in particular embodiments an aft frame 250 circumferentially surrounds the downstream end 206 of the unibody liner 200. As shown in FIG. 2, the aft frame 250 may be coupled to the outer casing 52 to provide support for the aft end 104 of the system 100. A mounting bracket 251 may be coupled to the aft frame 250. The mounting bracket 251 may pivot in a forward direction and/or aft direction with respect to the axial centerline 106 (FIG. 3) of the system 100. In this manner, the position or orientation of the mounting bracket 251 may be manipulated before and/or during installation of the system 100 to accommodate for tolerance stack up issues and/or to guide the system 100 and/or the LLI assembly 112 into position during installation into the combustor 50.

As shown in FIG. 2 the aft frame 250 is coupled to the outer casing 52 and the flange 120 is coupled to another portion of the outer casing 52. This mounting scheme results in relative movement between the fuel distribution manifold 110 and the LLI assembly 112 as the combustor 50 and/or the gas turbine 10 transitions between various thermal transient conditions such as during startup, shutdown and/or turndown operation. As a result, the mounting bracket 251 may be allowed to pivot to accommodate for the relative movement between the fuel distribution manifold 110 and the LLI assembly 112.

Figure 11:
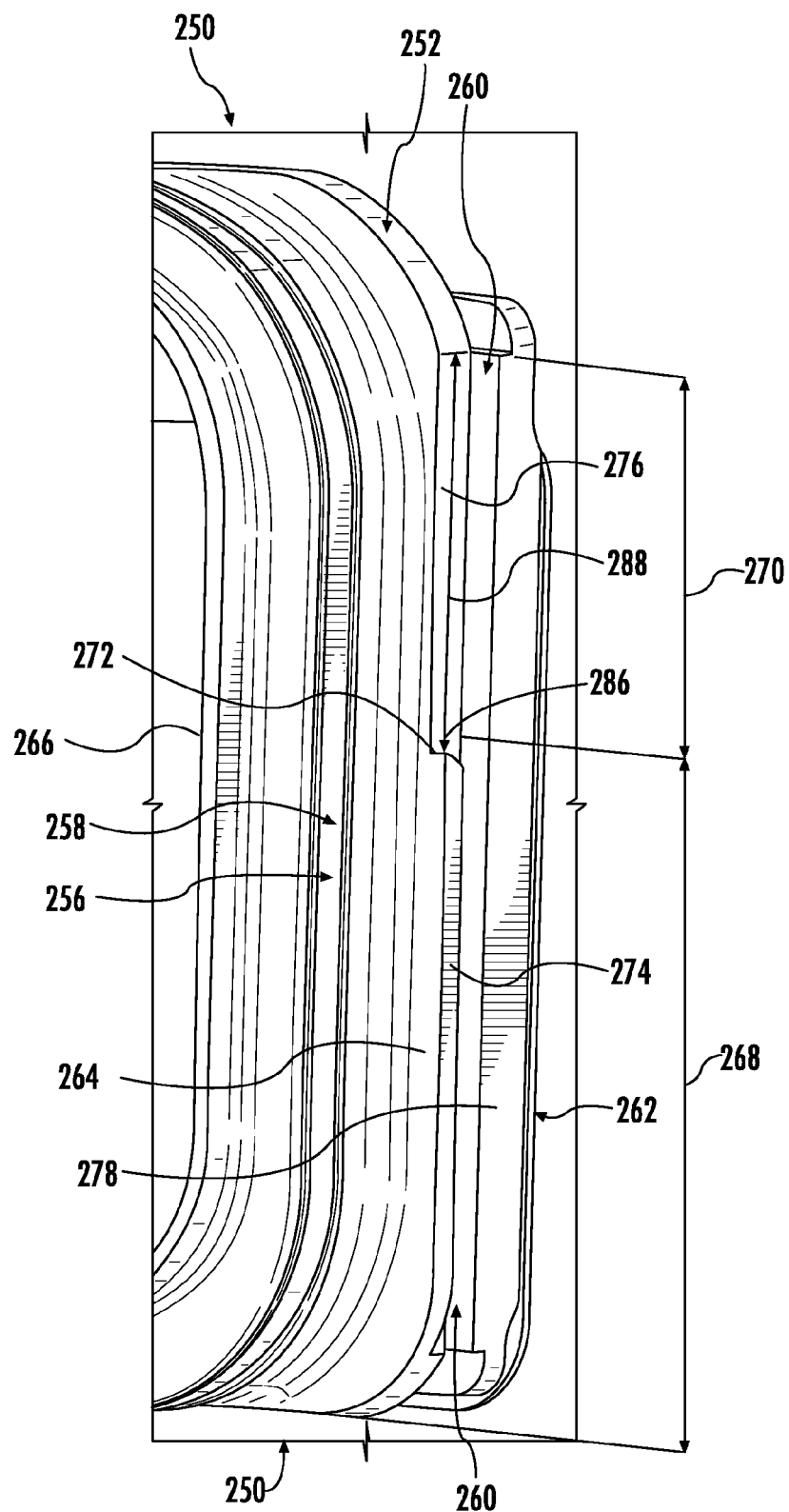
FIG. 11 provides an enlarged perspective view of an aft frame portion of the system as shown in FIG. 4, according to one embodiment of the present invention.
Figure 12:
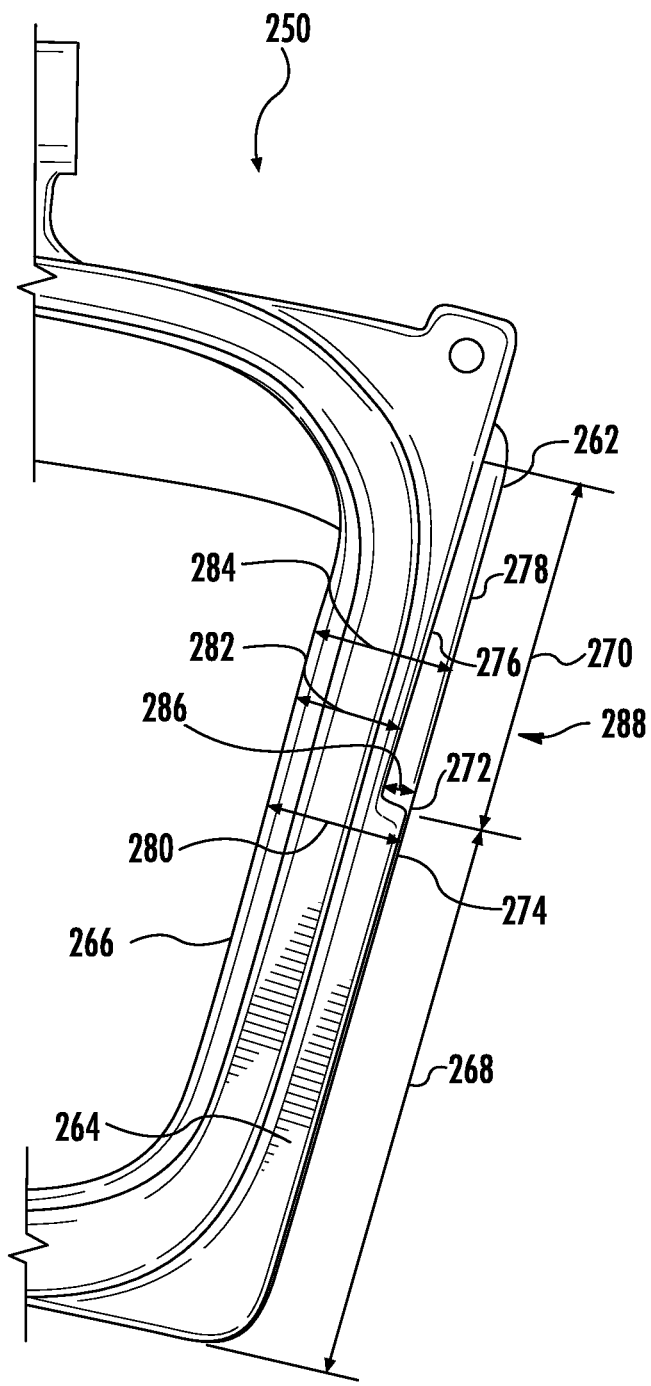
FIG. 12 provides an enlarged backside view of a portion of the aft frame as shown in FIG. 11, according to one embodiment of the present invention.

In particular embodiments, the aft frame 250 includes an inner portion 252 radially separated from an outer portion 254 and a pair of opposing sides 256 that extend between the inner and the outer portions 252 and 254. FIG. 11 provides an enlarged perspective view of one exemplary side portion 258 of the opposing side portions 256 of the aft frame 250 as shown in FIG. 4, according to at least one embodiment of the present disclosure. FIG. 12 provides an enlarged backside view of the side portion 258 as shown in FIG. 11.

As shown in FIG. 11, the aft frame 250 includes a side seal slot 260 that extends along the side portion 258. The side seal slot 260 extends at least partially between the inner portion 252 and the outer portion 254 of the aft frame 250. Although the side seal slot 260 will be generally described with reference to one side portion 256 the for clarity, it should be recognized by one of ordinary skill in the art that either or both of the opposing side portions 256 of the aft frame 250 may include a side seal slot 260 as described herein.

As shown in FIG. 11, the side seal slot 260 is at least partially defined between a downstream wall or aft wall 262 and an upstream wall or forward wall 264 of the aft frame 250. The upstream wall 264 and the downstream wall 262 extend outward from and substantially perpendicular to an inner surface 266 of the side portion 258. The upstream wall 264 and the downstream wall 262 extend at least partially between the inner portion 252 and the outer portion 254 of the aft frame 250. In particular embodiments, the downstream wall 262 extends from the inner portion 252 to the outer portion 254.

In one embodiment, as shown in FIG. 11, the upstream wall 264 comprises a first segment 268 and a second segment 270. The first segment 268 extends along the first side portion 258 from the inner portion 252 towards the outer portion 254 of the aft frame 250. The second segment 270 extends from an intersection point 272 with the first segment 268 towards the outer portion 254 of the aft frame 250. The first segment 268 defines a first outer surface 274, the second segment 270 defines a second outer surface 276 and the downstream wall 262 defines a third outer surface 278.

In particular embodiments, as shown in FIG. 12, the first segment 268 of the upstream wall 264 extends outward from the inner surface 266 of the first side 106 of the aft frame 250 a first outward distance 280. The first outward distance being defined between the inner surface 266 and the first outer surface 274 of the first segment 268. The second segment 270 extends outward from the inner surface 266 a second outward distance 282. The second outward distance 282 being defined between the inner surface 266 and the second outer surface 274 of the second segment 270. The downstream wall 262 extends outward from the inner surface 266 of the aft frame 250 a third outward distance 284. The third outward distance 284 being defined between the inner surface 266 and the third outer surface 274 of the downstream wall 262. Each of the first outward distance 280, the second outward distance 282 and the third outward distance 284 is measured with respect to a line that is substantially perpendicular to the inner surface 266. In one embodiment, the third outward distance 284 is greater than the second outward distance 282 of the second segment 270 of the upstream wall.

In particular embodiments, as shown in FIG. 12, the first outward distance 280 of the first segment 268 is greater than the second outward distance 282 of the second segment 270, thereby defining a step 286 at the intersection point 272 of the first segment 268 and the second segment 270 of the upstream wall 264 between the first outer surface 274 and the second outer surface 276. As a result, the second segment 270 at least partially defines a key-way or side seal guide feature 288, as shown in FIGS. 11 and 12, in the side portion 258 of the aft frame 250.

Figure 13:
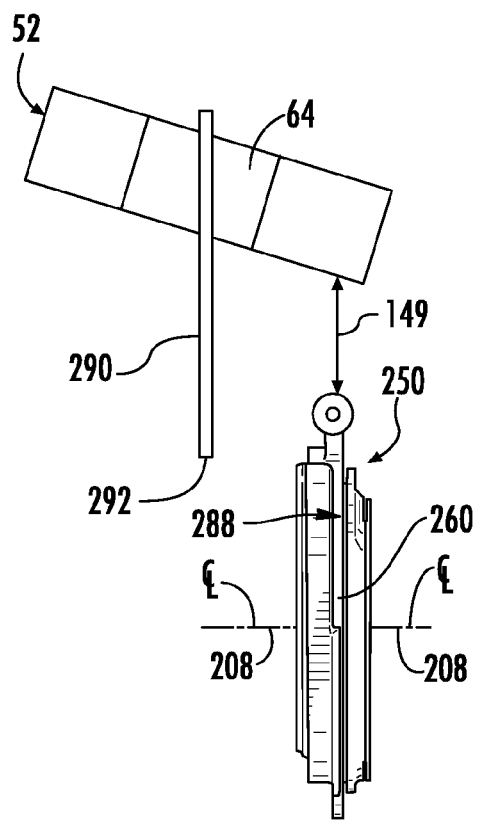
FIG. 13 provides a side view of the aft frame as shown in FIG. 11, according to one embodiment of the present invention.
Figure 14:
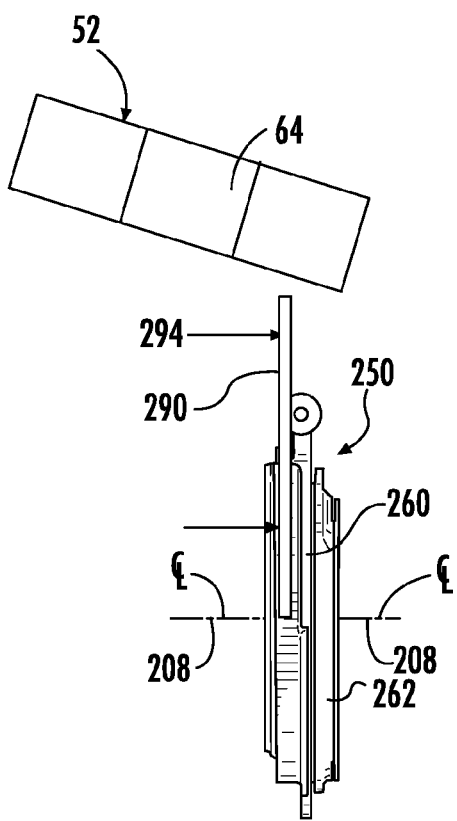
FIG. 14 provides a side view of the aft frame as shown in FIG. 11, according to one embodiment of the present invention.
Figure 15:
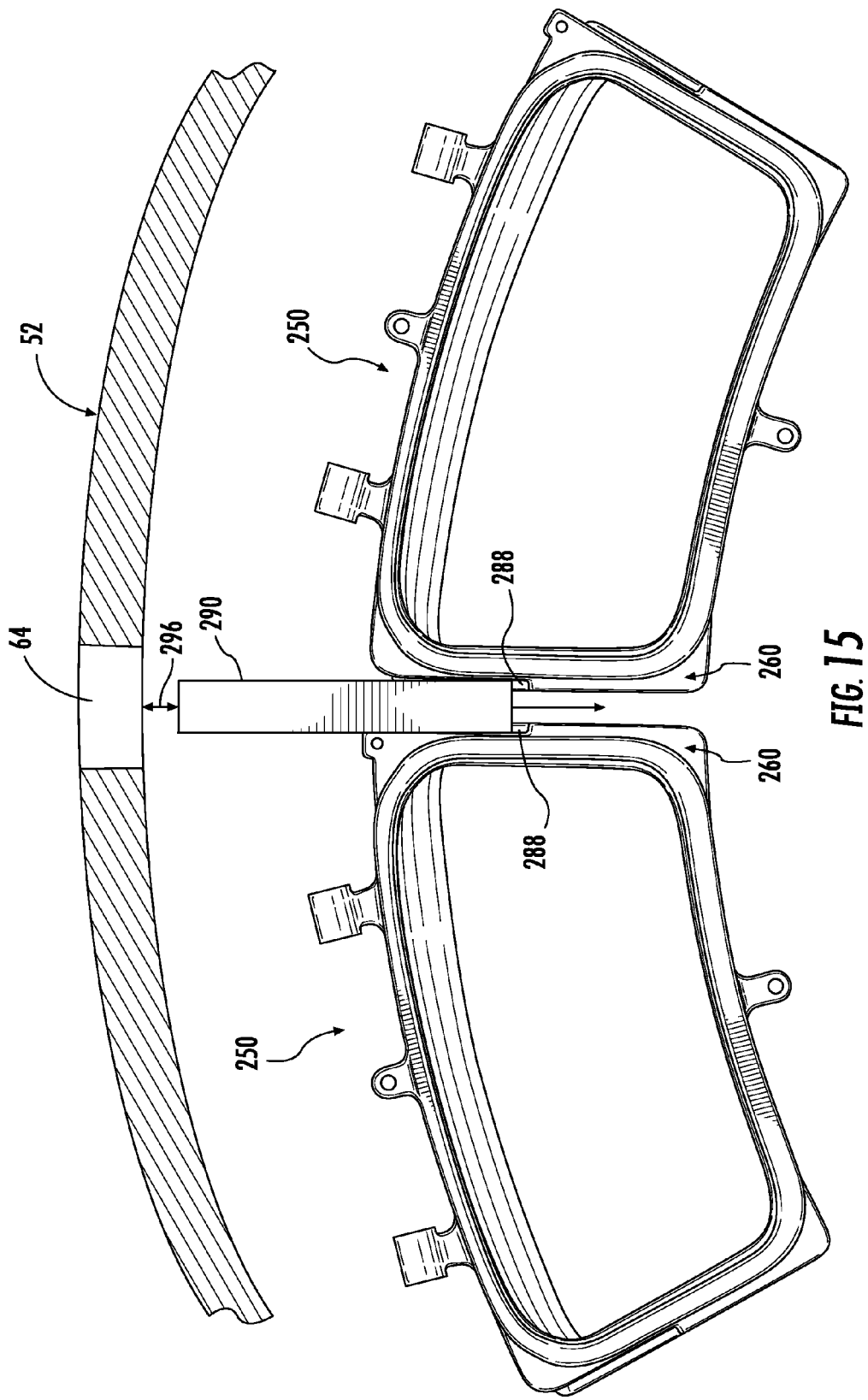
FIG. 15 provides a backside view of two adjacent aft frames as shown in FIG. 11, according to at least one embodiment of the present invention.

FIGS. 13, 14 and 15 illustrate one method for installing a side seal 290 into the side seal slot 260 utilizing the side seal guide feature 288 as illustrated in FIGS. 11 and 12 and as described herein. In particular embodiments, as shown in FIGS. 11 and 12, the step 286 may be configured to guide a bottom portion 292 (FIG. 13) of the side seal 290 into the side seal slot 260 in a substantially axial and/or a radial direction with respect to the axial centerline 208 of the unibody liner 200. For example, as shown in FIG. 12, the step 286 may be chamfered. In addition or in the alternative, the step 286 may be curved or rounded to guide the bottom portion 292 of the side seal 290 into the side seal slot 260 during installation of the system 100 into the combustor 50.

As shown in FIG. 13, the side seal 290 may be inserted generally radially through the arm-way 64. As shown in FIG. 14, the side seal 290 may be lowered such that a top portion 294 of the side seal 290 has generally cleared the outer casing 52. The bottom portion 292 of the side seal 290 is generally aligned with the side seal guide feature 288. The side seal 290 is then manipulated axially with respect to the axial centerline 208 into the side seal guide feature 288 towards the downstream wall 262 into the side seal slot 260. FIG. 15 provides a backside view of two adjacent aft frames 250 with the side seal 290 disposed between two adjacent side seal slots 260 as described herein. As shown in FIG. 15, the side seal 290 is then inserted radially into the side seal slot 260. The side seal guide feature reduces radial clearance 296 needed between the outer casing 52 in order to install the side seal 290 without bending and/or twisting the side seal 290. As a result, the potential for damaging the side seal 290 during installation may be greatly reduced, thereby increasing the mechanical life of the side seal 290 and/or reducing leakage of compressed working fluid between the high pressure plenum 54 and the hot gas path 224.

Figure 16:
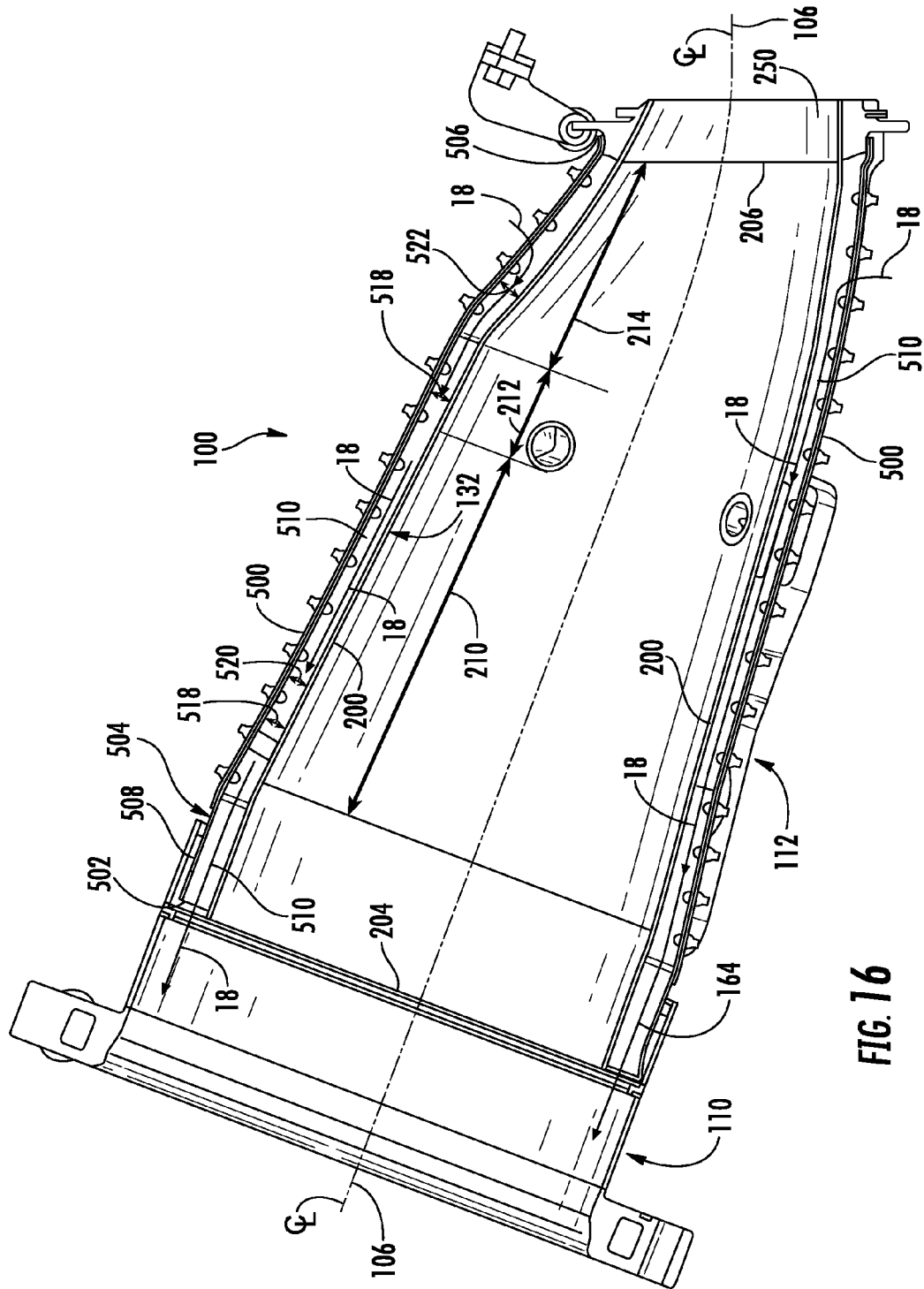
FIG. 16 is a cross sectional side view of the system as show in FIG. 3, according to one embodiment of the present invention.

Referring back to FIG. 4, in particular embodiments the LLI assembly further includes a flow sleeve 500 that circumferentially surrounds the unibody liner 200. FIG. 16 provides a cross sectional side view of the system 100 as shown in FIGS. 2, 3 and 4. As shown in FIGS. 4 and 16, the flow sleeve 500 includes a forward end 502 and an outer forward portion 504 disposed proximate to the forward end 502, and an aft end 506 that is axially separated from the forward end 502. The flow sleeve 500 extends continuously between the fuel distribution manifold 110 and the aft frame 250 and/or the aft end 206 of the main body 202 of the unibody liner 200, thereby eliminating the need for an additional impingement sleeve. The forward portion 504 of the flow sleeve 500 may at least partially define an outer engagement surface 508. In particular embodiments, as shown in FIGS. 4 and 16, the flow sleeve 500 extends continuously between the fuel distribution manifold 110 and the aft frame 250. In particular embodiments, as shown in FIG. 5, the forward portion 504 of the flow sleeve 500 is positioned generally concentrically within the support ring 128 of the fuel distribution manifold 110.

Figure 17:
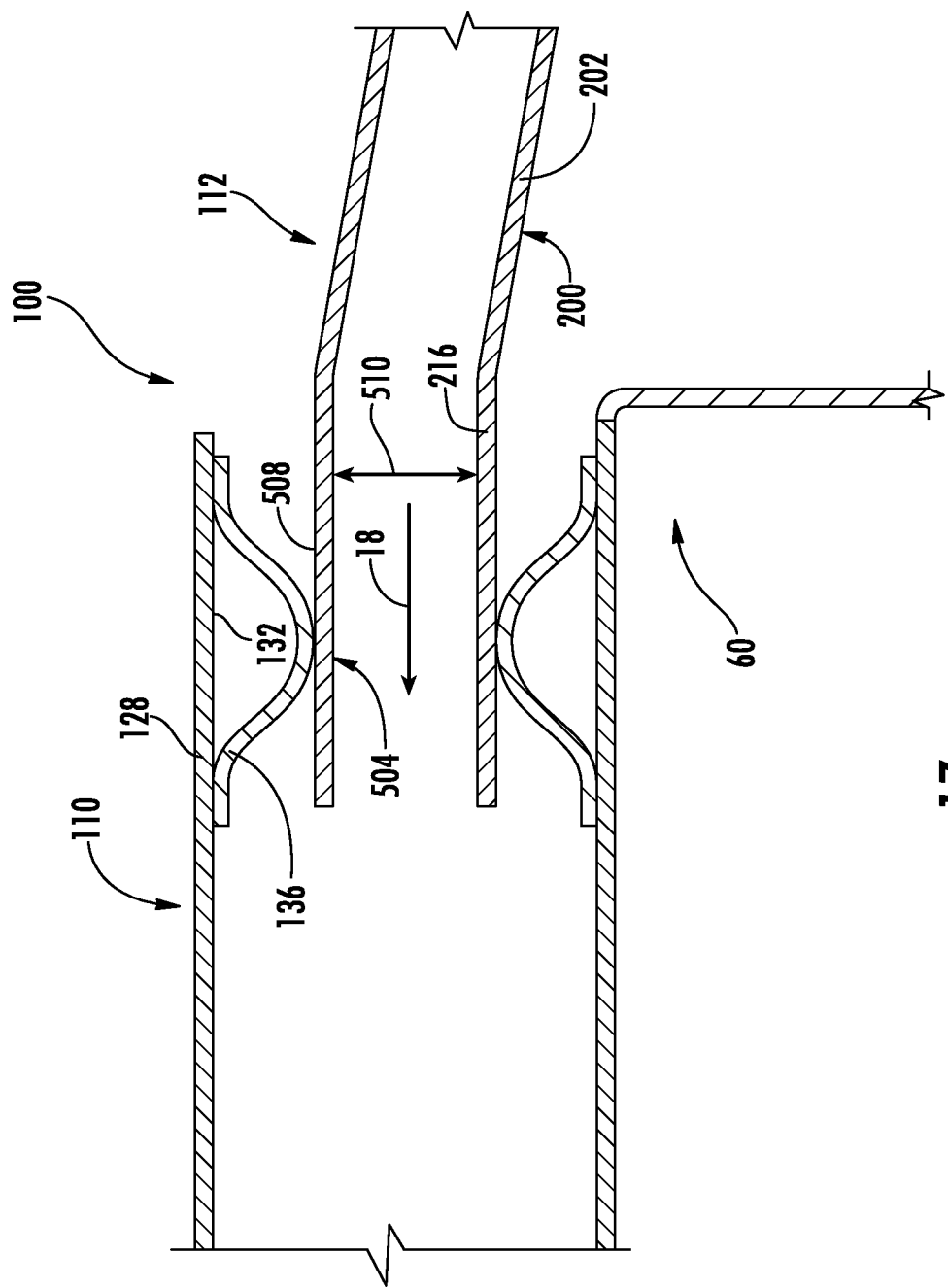
FIG. 17 is an enlarged cross sectional view of a portion of the system as shown in FIG. 3, according to one embodiment of the present invention.

FIG. 17 provides an enlarged view of a portion of the combustor 50 including a portion of the cap assembly 60 and a portion of the system 100 as shown in FIG. 2. In particular embodiments, as shown in FIG. 17, the outer engagement surface 508 of the forward portion 504 of the flow sleeve 500 is slidingly engaged with the inner surface 132 of the support ring 128. In this manner, the flow sleeve 500 is allowed to slide or translate along the inner side 132 of the support ring 128 of the fuel distribution manifold 110 during operation of the combustor 24. As further shown in FIG. 17, the support portion 216 of the main body 202 of the unibody liner 200 at least partially surrounds a portion of the cap assembly 60.

In particular embodiments, as shown in FIG. 17, the compression or spring seal 136 extends radially between the outer engagement surface 508 of the forward portion 504 of the flow sleeve 500 and the inner side 132 of the support ring 128. In particular embodiments, the spring seal 136 may be connected to the support ring 128. In the alternative, the spring seal 136 may be connected to the flow sleeve 500. The spring seal 136 at least partially provides structural support for the flow sleeve 500 during installation and/or operation of the gas turbine 10 while allowing for axial movement between the fuel distribution manifold 110 and the LLI assembly 112 during various operational modes of the gas turbine 10 such as during startup, shutdown and/or turndown operations.

In particular embodiments, as shown in FIG. 16, the flow sleeve 500 is radially separated from the unibody liner 200 so as to define an annular cooling flow passage 510 therebetween. The cooling flow passage 510 generally extends continuously along the length of the unibody liner 200. For example, the cooling flow passage 510 extends continuously between the aft frame 250 and the forward end 502 of the flow sleeve 500.

In particular embodiments, as shown in FIG. 4, the flow sleeve 500 may comprise a plurality of cooling or impingement holes 512 that provide for fluid communication through the flow sleeve 500 into the cooling flow passage 510 (FIG. 17) during operation of the gas turbine 10. In at least one embodiment, as shown in FIG. 4, the flow sleeve 500 includes two semi-annular flow sleeve sections 514 that wrap at least partially around the unibody liner 200. As shown in FIG. 3, the two semi-annular flow sleeve sections 514 may be joined together using a plurality of fasteners 516 such as bolts or other locking fasteners which are suitable for the operating environment of the system 100 within the combustor 50. In the alternative, the semi-annular flow sleeve sections 514 may be welded or joined together by any mechanical means suitable for the operating environment within the combustor 50.

In one embodiment, as shown in FIG. 16, the flow sleeve 500 is radially separated from the unibody liner 200 at a radial distance 518 that is generally constant between the aft frame 250 and the forward end 204 of the main body 202 of the unibody liner 200. In another embodiment, the radial distance 518 between the unibody liner 200 and the flow sleeve 500 varies along/across the main body 202 of the unibody liner 200. For example, the radial distance 518 may increase and/or decrease across the conical portion 210, the LLI injection portion 212 and/or the transition portion 214 of the main body 202 of the unibody liner 200 to control a flow rate and/or velocity of the compressed working fluid 18 (FIG. 2) at a particular location on the main body 202 as it flows through the cooling flow passage 510, thereby allowing for enhanced localized control over the cooling effectiveness of the compressed working fluid 18 in particular areas of the cooling flow passage 510.

In particular embodiments, the flow sleeve 500 is separated from the main body 202 of the unibody liner 200 at a first radial distance 520 with respect to the conical portion 210 and a second radial distance 522 with respect to the transition portion 214. In particular embodiments, the first radial distance 520 is greater than the second radial distance 522 along at least a portion of the conical portion 210, thereby providing for effective impingement cooling at the transition portion 214 of the main body 202 of the unibody liner 200 while reducing a pressure drop of the compressed working fluid 18 as it flows from the high pressure plenum 54 (FIG. 2), through the cooling holes 512 (FIG. 4), into the cooling flow passage 510 (FIG. 16) and along the main body 202. In the alternative, the second radial distance 522 may be greater than the first radial distance 520 along at least a portion of the transition portion 214 to control a flow velocity of the compressed working fluid 18 through the cooling flow passage 510 across the conical portion 210.

In operation, as described above and as illustrated in the various figures, a portion of the compressed working fluid 18 from the compressor 16 is routed into the cooling flow passage 510 through the plurality of cooling holes 512. The compressed working fluid 18 is focused onto the transition portion 214 of the main body 202 to provide impingement or jet cooling to the transition portion 214. The radial distance 518 between the flow sleeve 500 and the conical portion 210 and/or the transition portion 214 is set at a constant distance and/or a varying radial distance to control the flow volume and/or velocities of the compressed working fluid 18 through the cooling flow passage 510, thereby effectively cooling the main body 202 of the unibody liner 200, particularly at hot spots formed by increased combustion temperatures caused that may result from late-lean injection. The continuously extending flow sleeve 500 eliminates traditional connection joints of current flow sleeve assemblies. As a result, leakage from the cooling flow passage 510 may be reduced or eliminated, thereby improving the overall efficiency of the combustor 50. In addition, by eliminating the multiple components of existing flow sleeve assemblies, time and costs associated with assembly, disassembly and manufacture of the system 100 may be reduced.

As further shown in FIG. 17, the support portion 216 of the main body 202 of the unibody liner 200 may at least partially surround a portion of the cap assembly 60 and a compression or spring seal 524 may extend radially between the cap assembly 60 and the main body 202. This allows for radial support of the unibody liner 200 while allowing for axial movement between the LLI assembly 112 and the fuel distribution manifold during operation of the gas turbine 10.

Referring back to FIG. 4, in particular embodiments, the system 100 includes at least one outer air shield 600 that at least partially circumferentially surrounds at least a portion of the flow sleeve 500. As shown in FIG. 3, the outer air shield(s) 600 surround the LLI injector 116 to form an injection air plenum 604 around the LLI injector 116. In particular embodiments, as shown in FIGS. 3 and 4, the outer air shield(s) 600 are segmented into multiple outer air shields 600.

Figure 18:
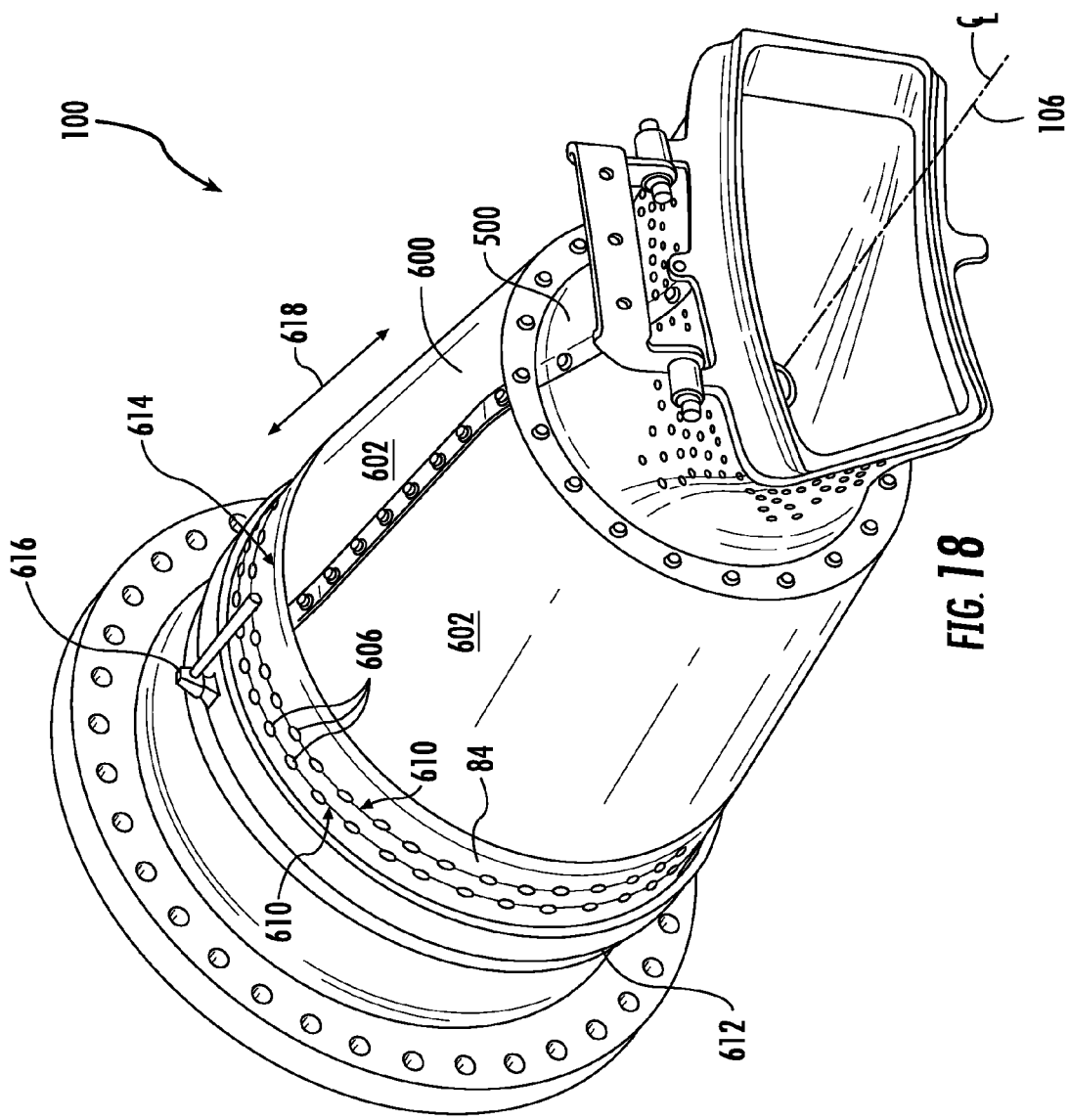
FIG. 18 is a perspective view of the system as shown in FIG. 3, according to one embodiment of the present invention.
Figure 19:
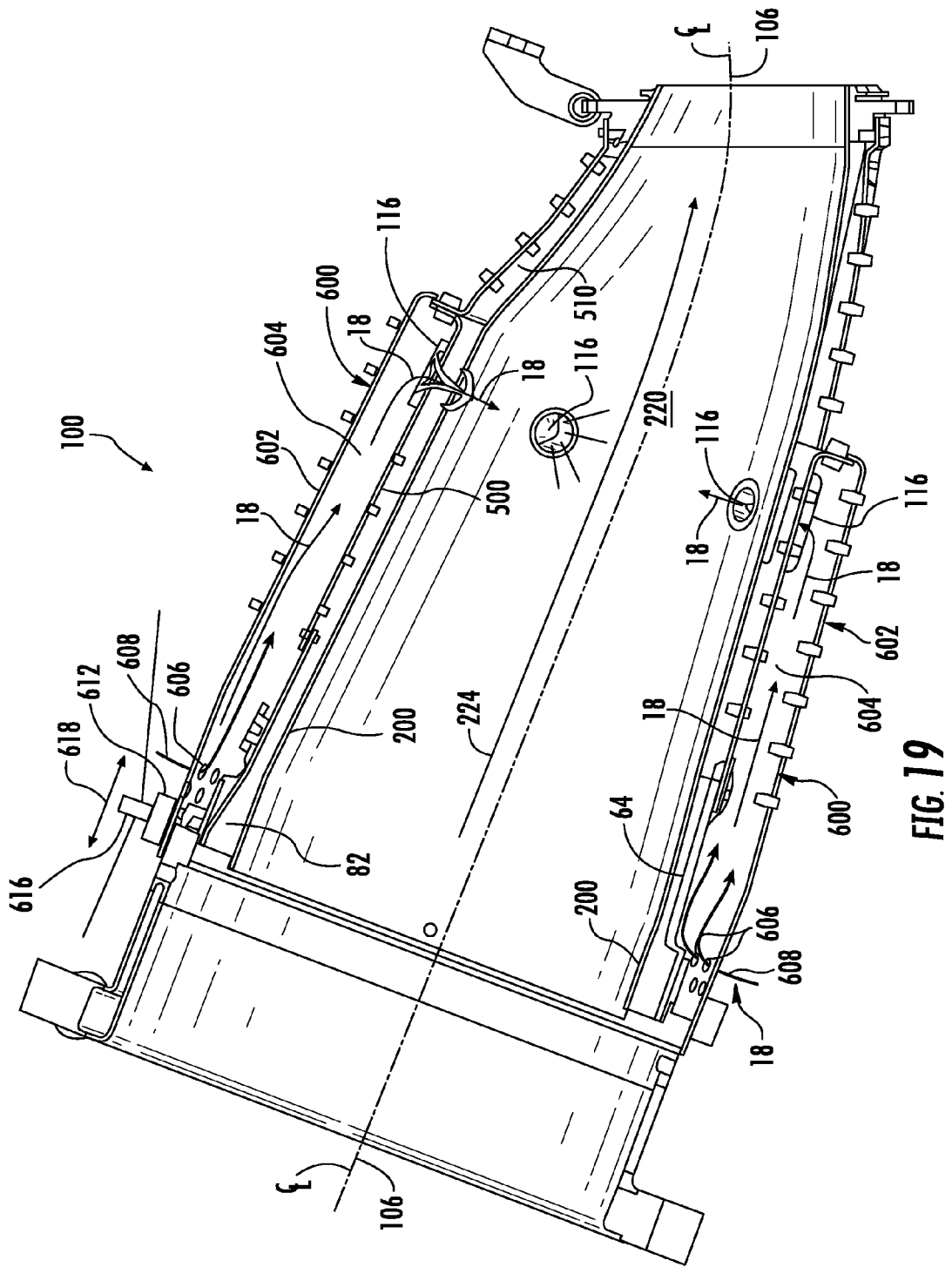
FIG. 19 is a cross section side view of a portion of the system as shown in FIG. 18, according to one embodiment of the present invention.

FIG. 18 provides a perspective view of the system 100 according to at least one alternate embodiment of the present invention, and FIG. 19 provides a cross section side view of the system as shown in FIG. 18. As shown in FIGS. 18 and 19, the outer air shield 600 may comprise of two or more semi-annular outer air shield sections 602 that extend circumferentially around at least a portion of the flow sleeve 500. As shown in FIG. 19 the outer air shield 600 is radially separated from the flow sleeve 500 to define the injection air plenum 604 between the outer air shield 600 and the flow sleeve 500. In particular embodiments, the outer air shield 600 at least partially surrounds each LLI injector 116. The LLI injector 116 is in fluid communication with the injection air plenum 604 to allow for flow between the air injection plenum 604 and the hot gas path 224 (FIG. 2).

In particular embodiments, as shown in FIGS. 18 and 19, at least one inlet passage 606 extends through the outer air shield 600 to define a flow path 608 into the injection air plenum 604. The inlet passage 606 generally provides for fluid communication between the high pressure plenum 54 (FIG. 2) and the injection air plenum 604 (FIG. 19). In this manner, the compressed working fluid 18 flows from the high pressure plenum 54 (FIG. 2), through the inlet passage 606 (FIGS. 18 and 19) along the flow path 608 (FIG. 19) into the air injection plenum 604. The compressed working fluid 18 then flows through the injector 116 and into the hot gas path 224. As shown in FIG. 18, the inlet passages 606 may be arranged in one or more rows 610 that extend circumferentially around at least a portion of the outer air shield 600.

In various embodiments, as shown in FIGS. 18 and 19, the system includes an outer sleeve or flow regulation sleeve 612. The flow regulation sleeve 612 extends circumferentially around at least a portion of the outer air shield 600 generally proximate to the inlet passages 606. In one embodiment, the flow regulation sleeve 612 is positioned upstream from the inlet passages 606 with respect to a direction of flow of the compressed working fluid 18 flowing from the high pressure plenum 54 (FIG. 2) into the inlet passages 606. In other words, the flow regulation sleeve 612 may be positioned over or on top of the inlet passages 606. In particular embodiments, the flow regulation sleeve 612 is slidingly engaged with an outer surface 614 (FIG. 18) of the outer air shield 600 to provide for relative movement between the outer air shield 600 and the flow regulation sleeve 612 during operation of the combustor 50. As shown in FIGS. 18 and 19, the flow regulation sleeve 612 may be coupled to a linkage mechanism 616. The linkage mechanism 616 may be coupled to an actuating mechanism (not shown) such as a linear actuator to cause the flow regulation sleeve 612 to translate axially across and/or circumferentially around the outer air shield 600.

Figure 20:
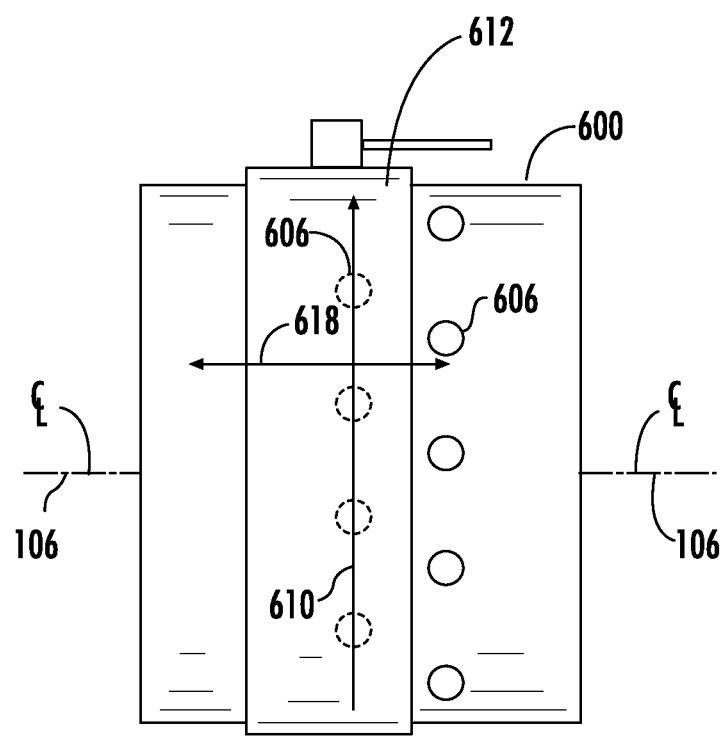
FIG. 20 is a side view of a portion of an outer air shield and a flow regulation sleeve as shown in FIG. 18, according to one embodiment of the present invention.

FIG. 20 illustrates a side view of a portion of the outer air shield 600 and the flow regulation sleeve 612 according to one embodiment of the present invention. As shown, the flow regulation sleeve 612 slides or translates in the axial direction 618 across the outer air shield 600 with respect to the axial centerline 106 of the system 100. The flow regulation sleeve 612 generally slides or translates axially across the inlet passages 606 through various axial positions so as to at least partially open or at least partially close the inlet passages 606, thereby increasing or restricting a flow rate of the compressed working fluid 18 flowing through the inlet passages 606 along the flow path 608 (FIG. 19) and into the injection air plenum 604 (FIG. 19). As a result, the flow of the compressed working fluid 18 (FIG. 19) flowing into the injection air plenum 604 during operation of the injector 116 may be adjusted, thereby providing for active control of the mass flow into the hot gas path 224 (FIG. 2) during late-lean injection, thus resulting in improved overall performance of the combustor 50.

Figure 21:
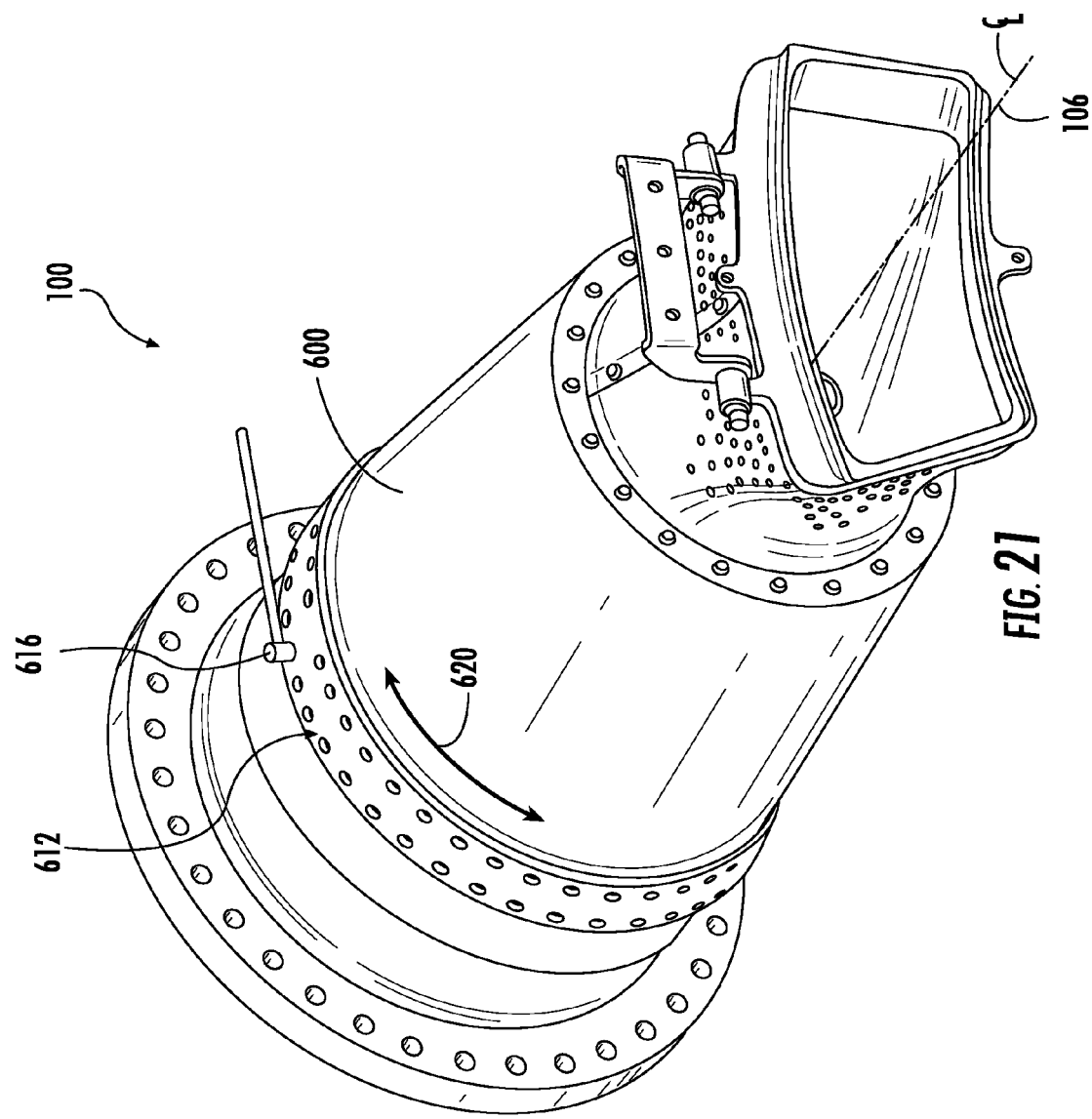
FIG. 21 is a perspective view of the system according to one embodiment of the present invention.
Figures 22, 23:
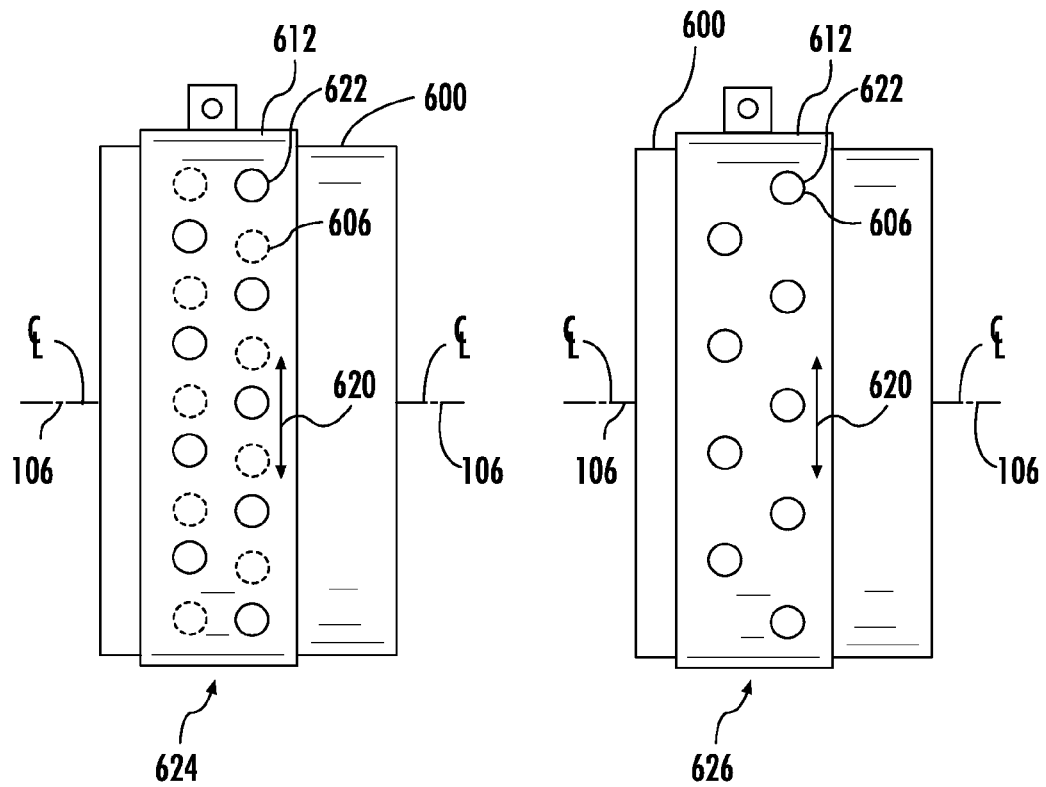
FIG. 22 is a side view of a portion of an outer air shield and a flow regulation sleeve, according to one embodiment of the present invention.
FIG. 23 is a side view of a portion of the outer air shield and the flow regulation sleeve as shown in FIG. 22, according to one embodiment of the present invention.

FIG. 21 provides a perspective view of the system 100 including the flow regulation sleeve 612 according to an alternate embodiment of the present disclosure, and FIGS. 22 and 23 illustrate the flow regulation sleeve 612 at various circumferential positions according to various embodiments of the present invention. As shown, the flow regulation sleeve 612 slides or translates circumferentially or in a circumferential direction 620 around the outer air shield 600 with respect to the axial centerline 106 of the system 100. As shown in FIGS. 22 and 23, the flow regulation sleeve 612 generally slides or translates circumferentially across the inlet passages 606 through various positions so as to at least partially open or at least partially close the inlet passages 606, thereby restricting or increasing flow of the compressed working fluid 18 (FIG. 2) flowing into the injection air plenum 604 along the flow paths 90 defined by the inlet passages 606.

In particular embodiments, as shown in FIGS. 22 and 23 the flow regulation sleeve 612 includes a plurality of openings 622. The openings 622 are generally arranged to at least partially align with the inlet passages 606 as the flow regulation sleeve 612 slides or translates through the various circumferential positions. The flow regulation sleeve 612 may be positioned at any point between a first position 624 (FIG. 22) wherein flow of the compressed working fluid 18 through the inlet passages 606 (FIG. 19) along the flow paths 608 (FIG. 19) is fully restricted, and a second position 626 (FIG. 23) where flow of the compressed working fluid 18 (FIG. 2) through the inlet passages 606 (FIG. 19) along the flow paths 608 (FIG. 19) is fully open or unrestricted by the flow regulation sleeve 612, thereby increasing the flow through the inlet passages 606 along the flow paths 608 and into the injection air plenum 604.

During certain operation modes of the gas turbine 10 such as during cold fuel operation, liquid fuel operation and/or start-up operation the flow regulation sleeve 612 may be actuated so that is slides or translates across and/or around the outer air shield 600 to at least partially or fully restrict the flow of the compressed working fluid 18 through the inlet passages 606, thereby reducing or preventing air dilution to the combustion gases 26 (FIG. 2) flowing through the hot gas path 224.

The flow regulation sleeve 612 provides a flow barrier between the high pressure plenum 54 (FIG. 2) and the injection air plenum 604 (FIG. 19). As a result, a greater portion of the compressed working fluid 18 may be routed through the cooling flow passage 510 and through the fuel nozzle 58 (FIG. 2), thereby reducing the potential for flame holding at the fuel nozzle 58. In addition, by shutting off or restricting the flow of the compressed working fluid 18 to the injection air plenum 604, dilution of the combustion gases 26 flowing through the hot gas path 224 may be reduced or eliminated, thereby enhancing emissions performance and/or mechanical performance of the combustor 50.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

What is claimed is:

1. A system for providing fuel to a combustor of a gas turbine, the system comprising:
   a. an annular fuel distribution manifold, the fuel distribution manifold at least partially defining a fuel plenum, the fuel distribution manifold having a forward end axially separated from an aft end, a flange that extends radially outward and circumferentially around the forward end and an annular support ring that extends downstream from the flange;
   b. a late lean injector (LLI) injection assembly that extends downstream from the fuel distribution manifold, the LLI injection assembly having a unibody liner that at least partially defines a primary combustion zone and a secondary combustion zone, a late lean (LLI) injector that extends substantially radially through the unibody liner and that provides for fluid communication through the unibody liner into the secondary combustion zone; and
   c. a fluid conduit that extends between the LLI injector and the fuel distribution manifold, the fluid conduit being in fluid communication with the fuel plenum;
   d. wherein the LLI assembly further includes a flow sleeve that circumferentially surrounds at least a portion of the unibody liner, the flow sleeve being radially separated from the unibody liner to at least partially define an annular cooling flow passage therebetween, wherein the LLI injector extend through the flow sleeve.

2. The system as in claim 1, wherein the fluid conduit is serpentine shaped.

3. The system as in claim 1, wherein the flange comprises:
   a. the fuel plenum that extends circumferentially within the flange and an outer surface that extends circumferentially around the flange;
   b. a first orifice and a second orifice that provide for fluid communication through the outer surface of the flange into a fuel distribution plenum;
   c. a fuel distribution cap that extends partially across the outer surface of the flange and surrounds the first orifice and the second orifice; and
   d. the fuel distribution plenum at least partially defined within the fuel distribution cap, the fuel distribution plenum being in fluid communication with the first orifice and the second orifice.

4. The system as in claim 3, wherein the flange comprises a plurality of bolt holes that extend axially through the flange, wherein the first orifice is circumferentially separated from the second orifice by at least one of the plurality of bolt holes.

5. The system as in claim 3, wherein the fuel distribution cap comprises a floor portion that partially defines the fuel distribution plenum, the fuel distribution cap having a first outlet coaxially aligned with the first orifice and a second outlet coaxially aligned with the second orifice.

6. The system as in claim 3, further comprising a gap defined between a floor portion of the fuel distribution cap and the outer surface of the flange.

7. The system as in claim 3, further comprising a first orifice insert disposed within the first orifice and a second orifice insert disposed within the second orifice.

8. The system as in claim 7, wherein an insulation gap is defined between the first orifice insert and the first orifice and between the second orifice insert and the second orifice.

9. The system as in claim 1, wherein the unibody liner includes a main body that defines a conical portion, a LLI injection portion that extends downstream from the conical portion and a transition portion that extends downstream from the LLI injection portion.

10. The system as in claim 9, wherein the transition portion has a generally non-circular cross-section.

11. The system as in claim 9, wherein the main body of the unibody liner is a singular component.

12. The system as in claim 1, wherein the unibody liner comprises:
   a. a main body having a forward end and an aft end, the main body defining a cross-sectional flow area and an axial flow length that is defined between the forward end and the aft end, the main body further defining a LLI injection portion disposed downstream from the forward end and upstream from the aft end, wherein the LLI injector extend through the main body at the LLI injection portion; and
   b. wherein the cross-sectional flow area decreases along the axial flow length between the forward end and the LLI injection portion and increases along at least a portion of the axial flow length downstream from the LLI injection portion.

13. The system as in claim 12, wherein the cross-sectional flow area increases along a first portion of the axial flow length that is defined downstream from the LLI injection portion and decreases along a second portion of the axial flow length that is defined downstream from the first portion.

14. The system as in claim 12, wherein the cross-sectional flow area increases continuously along the axial flow length downstream from the LLI injection portion to the aft end.

15. The system as in claim 12, wherein the cross-sectional flow area is substantially constant along the axial flow length across the LLI injection portion.

16. The system as in claim 12, wherein the cross-sectional flow area decreases in a downstream direction along the axial flow length across the LLI injection portion.

17. The system as in claim 12, wherein the cross-sectional flow area increases in a downstream direction along the axial flow length across the LLI injection portion.

18. The system as in claim 12, further comprising a conical portion that extends between the forward end and the LLI injection portion and a transitional portion that extends downstream from the LLI injection portion and terminates at the aft end.

19. The system as in claim 1, wherein the unibody liner includes a downstream end having an aft frame that circumferentially surrounds the downstream end, the aft frame comprising:
   a. an inner portion radially separated from an outer portion and a pair of opposing side portions that extend between the inner and the outer portions;
   b. a side seal slot that extends along one side portion of the opposing side portions between the inner and the outer portions of the aft frame, the side seal slot being at least partially defined between a downstream wall and an upstream wall;
   c. wherein a first segment of the upstream wall extends from the inner portion towards the outer portion at a first outward distance, and a second segment of the upstream wall extends from an intersection point with the first segment towards the outer portion of the aft frame at a second outward distance, the second segment of the upstream wall at least partially defining a side seal guide feature to allow for axial insertion of a bottom portion of a side seal into the side seal slot.

20. The system as in claim 19, wherein the first outward distance is greater than the second outward distance.

21. The system as in claim 19, further comprising a step that is defined between an outer surface of the first segment and an outer surface of the second segment.

22. The system as in claim 19, wherein a step is configured to guide the bottom portion of the side seal into the side seal slot in an axial and a radial direction.

23. The system as in claim 19, wherein the gas turbine includes an outer casing and a second outer casing, the flange being connected to a portion of the outer casing and the aft frame being connected to another portion of the outer casing.

24. The system as in claim 1, wherein the support ring at least partially defines the downstream end of the fuel distribution manifold, the support ring having an inner side portion radially separated from an outer side portion.

25. The system as in claim 1, wherein the flow sleeve comprises of two or more semi-annular flow sleeve sections.

26. The system as in claim 1, wherein the flow sleeve extends continuously as a singular component between the aft end of the fuel distribution manifold and an aft end of the LLI assembly.

27. The system as in claim 1, wherein the flow sleeve includes a plurality of cooling holes that provide for fluid communication into the cooling flow passage.

28. The system as in claim 1, wherein the flow sleeve is radially separated from the unibody liner at a radial distance that varies across the unibody liner.

29. The system as in claim 1, wherein the support ring includes an inner surface, a forward portion of the flow sleeve being positioned concentrically within the support ring, the forward portion being slidingly engaged with the inner surface of the support ring.

30. The system as in claim 29, further comprising a spring seal that extends radially between the support ring and the forward portion of the flow sleeve.

31. The system as in claim 1, further comprising an outer air shield that circumferentially surrounds at least a portion of the combustion liner and the LLI injector, the outer air shield at least partially defining an injection air plenum that is in fluid communication with the LLI injector, and an inlet passage that defines a flow path into the injection air plenum.

32. The system as in claim 31, further comprising a flow regulation sleeve slidingly engaged with the outer air shield, wherein the flow regulation sleeve has a first position that restricts flow through the inlet passage and a second position that increases flow through the inlet passage.

33. The system as in claim 32, wherein the flow regulation sleeve slides axially across the outer air shield with respect to an axial centerline of the combustor.

34. The system as in claim 32, wherein the flow regulation sleeve slides circumferentially around the outer air shield with respect to an axial centerline of the combustor.

35. The system as in claim 32, wherein the first position of the flow regulation sleeve corresponds to a fully closed inlet passage and the second position of the flow regulation sleeve corresponds to a fully open inlet passage.

* * * * *